United States Patent
Kurosawa et al.

(10) Patent No.: US 7,760,306 B2
(45) Date of Patent: Jul. 20, 2010

(54) LIQUID CRYSTAL DEVICE AND MANUFACTURING METHOD THEREFOR, AND ELECTRONIC APPARATUS

(75) Inventors: Ryuichi Kurosawa, Shiojiri (JP); Nobukazu Nagae, Suwa (JP); Takeshi Miyashita, Suwa (JP)

(73) Assignee: Seiko Epson Corporation (JP)

( * ) Notice: Subject to any disclaimer, the term of this patent is extended or adjusted under 35 U.S.C. 154(b) by 325 days.

(21) Appl. No.: 12/032,793

(22) Filed: Feb. 18, 2008

(65) Prior Publication Data
US 2008/0291370 A1     Nov. 27, 2008

(30) Foreign Application Priority Data
Feb. 19, 2007   (JP)   ............................. 2007-038243
Nov. 28, 2007   (JP)   ............................. 2007-307604

(51) Int. Cl.
*G02F 1/1337*   (2006.01)
*G02F 1/1343*   (2006.01)
*G02F 1/136*    (2006.01)

(52) U.S. Cl. ........................... 349/130; 349/139; 349/44
(58) Field of Classification Search ................. 349/130, 349/139, 44, 5
See application file for complete search history.

(56) References Cited

U.S. PATENT DOCUMENTS
6,067,141 A * 5/2000 Yamada et al. ............... 349/129
6,323,932 B1 * 11/2001 Zhang et al. ................. 349/155
6,593,626 B2 * 7/2003 Hirabayashi et al. ........ 257/350

FOREIGN PATENT DOCUMENTS
| JP | 10-293307 | | 11/1998 |
| JP | 2001-343651 | | 12/2001 |
| JP | 2005-107373 | | 4/2005 |
| JP | 2005107373 A | * | 4/2005 |

* cited by examiner

*Primary Examiner*—Mike Qi
(74) *Attorney, Agent, or Firm*—Harness, Dickey & Pierce, P.L.C.

(57) ABSTRACT

A liquid crystal device includes: a first substrate; a second substrate that is disposed facing the first substrate; a liquid crystal layer that is sandwiched between the first substrate and the second substrate and is composed of a liquid crystal exhibiting, in an initial alignment state thereof, a vertical alignment and having negative dielectric anisotropy; a light shielding film that is formed on a side of the liquid crystal layer on the first substrate and that corresponds to a non-display region and defining a display region; a pixel electrode that is disposed, on the first substrate, from the display region with a periphery projecting on the light shielding film; a vertical alignment film that is disposed, on the pixel electrode, only in the display region or from the display region with a periphery projecting in the non-display region; and a horizontal alignment film that is disposed, in an area without the vertical alignment film above the light shielding film, with a periphery projecting on the pixel electrode.

7 Claims, 20 Drawing Sheets

TRANSMISSION AXIS OF POLARIZING PLATE 71a  72b

PLANE TRANSMITTANCE DISTRIBUTION
IN INITIAL SETTING

LIQUID CRYSTAL DEVICE AND MANUFACTURING METHOD THEREFOR, AND ELECTRONIC APPARATUS

BACKGROUND OF THE INVENTION

1. Technical Field

The present invention relates to a liquid crystal device and a manufacturing method therefor, and an electronic apparatus.

2. Related Art

As an apparatus for displaying an image on a large screen using a liquid crystal device, there is a liquid crystal projector.

High luminance and high contrast are required for a projector. In this respect, a liquid crystal device of a vertical alignment mode can provide displays with high contrast.

Recently, this mode have been increasingly employed as the liquid crystal alignment mode of a liquid crystal device for a projector.

However, in the vertical alignment mode, liquid crystals align themselves perpendicularly to the surface of a substrate, and the interaction in the azimuth along which the liquid crystals fall when voltage is applied is weak.

If a pixel potential is applied to a pixel electrode and a counter electrode, an electric field generated from an end of the pixel electrode is inclined in a lateral direction in the vicinity of the pixel electrode.

Due to the electric filed in a lateral direction, liquid crystal molecules sometimes fall to cause a disclination by conflicts of liquid crystal molecules.

If a disclination occurs, display defects such as irregularity in brightness, decrease in contrast, and image sticking become visible.

To overcome such defects, in a normal vertical alignment mode, a method of tilting liquid crystal molecules a few degrees relative to a substrate surface is employed.

In this method, however, when the liquid crystal molecules are tilted by a few degrees, birefringence of liquid crystal molecules occurs.

The birefringence causes light leakage.

The light leakage decreases contrast.

To solve this problem, it is considered that liquid crystals are vertically aligned in pixel regions to ensure good contrast characteristics whereas liquid crystals are horizontally aligned mainly in non-display regions around the pixel regions to control the orientation of liquid crystal, thereby preventing a disclination.

For example, JP-A-2005-107373 and JP-A-2001-343651, which are first and second examples of related art, respectively, disclose liquid crystal devices having such a configuration.

In the first example, an inorganic alignment film is formed by an oblique deposition method, and the orientation angle of the inorganic alignment film is controlled by varying the thickness of the inorganic alignment film so that the azimuth of liquid crystals on the alignment film is controlled.

In a liquid crystal device in the second example, a vertical alignment regulating region is provided in a pixel region, and another alignment regulating region is provided in a region except the pixel region.

By this means, liquid crystal molecules in a pixel are oriented in one direction when voltage is applied.

However, the first example describes, "The pretilt angles in the display region and non-display region are 40 to 60 degrees with respect to the substrate normal direction. The pretilt angle in the non-display region is set larger than that in the display region."

Therefore, a high-contrast display caused by vertical alignment at 90 degrees with respect to the substrate surface is not achieved.

The second example describes, "The pretilt angle in the display region with respect to the surface of an alignment film is 88 to 90 degrees, and the pretilt angle in the alignment regulating region is 0 to 87 degrees".

The range of the pretilt angle is very large.

Actually, the orientation of liquid crystals often cannot be controlled according to the conditions, and therefore the liquid crystal device in this example cannot be used, i.e., a disclination occurs in some cases.

SUMMARY

An aspect of the invention is to provide a liquid crystal device that has good contrast characteristics and in which display defects such as a disclination are prevented, a manufacturing method thereof, and an electronic apparatus.

A liquid crystal device according to a first aspect of the invention includes, a first substrate; a second substrate disposed facing the first substrate; a liquid crystal layer sandwiched between the first substrate and the second substrate and composed of a liquid crystal exhibiting, in an initial alignment state thereof, a vertical alignment and having negative dielectric anisotropy; a light shielding film, formed on a side of the liquid crystal layer on the first substrate, corresponding to a non-display region and defining a display region; a pixel electrode disposed, on the first substrate, from the display region with a periphery projecting on the light shielding film; a vertical alignment film disposed, on the pixel electrode, only in the display region or from the display region with a periphery projecting in the non-display region; and a horizontal alignment film disposed, in an area without the vertical alignment film above the light shielding film, with a periphery projecting on the pixel electrode.

Note that, in the invention, the term "perimeter" means the inside of one region and the vicinity of the boundary of the inside and the outside of the region, whereas the term "periphery" means the outside of one region and the vicinity of the boundary of the inside and the outside of the region.

In this way, liquid crystals are oriented at a predetermined azimuth angle above the perimeter of a pixel electrode that projects from the display region side to the non-display region side.

Therefore, even if liquid crystals in the display region are vertically aligned at a tilt angle of approximately 90 degrees with no voltage applied, the direction in which the liquid crystals are inclined is controlled by the aforementioned liquid crystals above the perimeter.

The influence of a transverse electric field generated from an end of the pixel electrode is suppressed, and the liquid crystals in the display region are oriented in a constant direction.

Thus, good contrast characteristics are provided and orientation defects (disclination) of liquid crystals in the display region are prevented.

A horizontal alignment film that causes liquid crystals to be aligned at a predetermined azimuth angle is formed only outside the display region.

This prevents light leakage caused by arrangement of horizontally aligned liquid crystals in a display region to prevent a decrease in display contrast in each pixel.

It is preferable that the liquid crystal on the horizontal alignment film have a pretilt angle LP satisfying a range of $LP \leq A \times LPW + B$ (where LPW is a width of a second area above the aforementioned perimeter, $A=(97-6.5 \times d) \times$ EG$^{(-0.58)}$, B=22×log e(EG)+(56.7−12×d), EG is a distance between the pixel electrodes, and d is a cell gap).

Setting elements so as to satisfy the above expression prevents an orientation defect of liquid crystals in the display region, and a liquid crystal device can be obtained in which a disclination is prevented.

It is also preferable that the A be in a range from 72.64 to 221.9 inclusive and the B be in a range from −8.7 to 42.7 inclusive.

In this way, a liquid crystal device can be obtained in which an orientation defect of liquid crystals in the display region is further prevented.

It is also preferable that the horizontal alignment film be made of photosensitive resin.

In this way, a patterning method using light can be used in forming the horizontal alignment film.

Specifically, the horizontal alignment film is positioned in a non-display region, and a light shielding film defining the non-display region is formed on a substrate.

Using positive resin as photosensitive resin, the photosensitive resin is exposed to light and developed with the light shielding film serving as a mask, thereby enabling formation of an alignment film pattern.

The alignment film pattern formed in this way is positioned only in an area coated with the light shielding film, that is, inside the non-display region.

It is also preferable to include a pair of quarter-wave plates disposed outside the first substrate and the second substrate such that slow axes of the pair of quarter-wave plates are orthogonal to each other; and polarizing plates disposed outside the pair of quarter-wave plates such that transmission axes of the polarizing plates have approximately 45 degrees with respect to the slow axes of the pair of quarter-wave plates and the transmission axes of the polarizing plates are orthogonal to each other.

In this way, a birefringence effect is obtained without depending on the azimuth of liquid crystal molecules during white display.

This allows the luminance of the transmission liquid crystal device to be greatly improved.

A method for manufacturing a liquid crystal device according to a second aspect of the invention, the liquid crystal device includes: a first substrate; a second substrate disposed facing the first substrate; a liquid crystal layer sandwiched between the first substrate and the second substrate and composed of a liquid crystal exhibiting, in an initial alignment state thereof, a vertical alignment and having negative dielectric anisotropy; and a light shielding film, formed on a side of the liquid crystal layer on the first substrate, corresponding to a non-display region and defining a display region. The method includes: (a) forming, on the first substrate, a pixel electrode from the display region with a periphery projecting on the light shielding film; (b) forming, on the pixel electrode, a vertical alignment film only in the display region or from the display region with a periphery projecting in the non-display region; and (c) forming, in an area without the vertical alignment film above the light shielding film, a horizontal alignment film with a periphery projecting on the pixel electrode.

In this way, since a horizontal alignment film that causes liquid crystals to be aligned at a predetermined azimuth angle is formed on the perimeter of a pixel electrode projecting from the display region side to the non-display region side, liquid crystals above the perimeter are oriented approximately in a single direction.

Even if the liquid crystals in the display region are vertically aligned such that the pretilt angle of the liquid crystals is approximately 90 degrees with respect to the substrate surface with no voltage applied, the direction in which the liquid crystals are inclined is controlled by the aforementioned liquid crystals above the perimeter.

The influence of a transverse electric field generated from an end of the pixel electrode is suppressed, and the liquid crystals in the display region are oriented in a constant direction.

Thus, a liquid crystal device can be manufactured in which an orientation defect of liquid crystals in the display region is prevented.

A horizontal alignment film that causes liquid crystals to be aligned at a predetermined azimuth angle is formed in a non-display region.

This prevents light leakage caused by arrangement of horizontally aligned liquid crystals in a display region.

A liquid crystal can be manufactured in which a decrease in display contrast is prevented.

It is also preferable that the aforementioned step (c) include: applying photosensitive resin to form a resin film; performing light exposure and development using the light shielding film as a mask from a side opposite to the light shielding film on the first substrate to form an alignment film pattern corresponding to the light shielding film; and rubbing the alignment film pattern to make the horizontal alignment film.

In this way, a mask and the like for forming a horizontal alignment film need not to be used, making it possible to simplify the manufacturing processes.

The patterning of a horizontal alignment film can be performed with high precision, allowing formation of a horizontal alignment film only in an area coated with a light shielding film, that is, inside a non-display region.

Accordingly, liquid crystals aligned at a predetermined azimuth angle by means of a horizontal alignment film is disposed only in a non-display region, and only vertically aligned liquid crystals are disposed in a display region.

An electronic apparatus according to a third aspect of the invention includes the liquid crystal device mentioned above.

In this way, the above-mentioned liquid crystal device can be used as display screens of electronic apparatuses such as a liquid crystal display television and a cellular phone, a monitor of a personal computer, and a light modulation device of a liquid crystal projector.

Using the above-mentioned liquid crystal device for such applications makes it possible to provide electronic apparatuses that are excellent in display characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
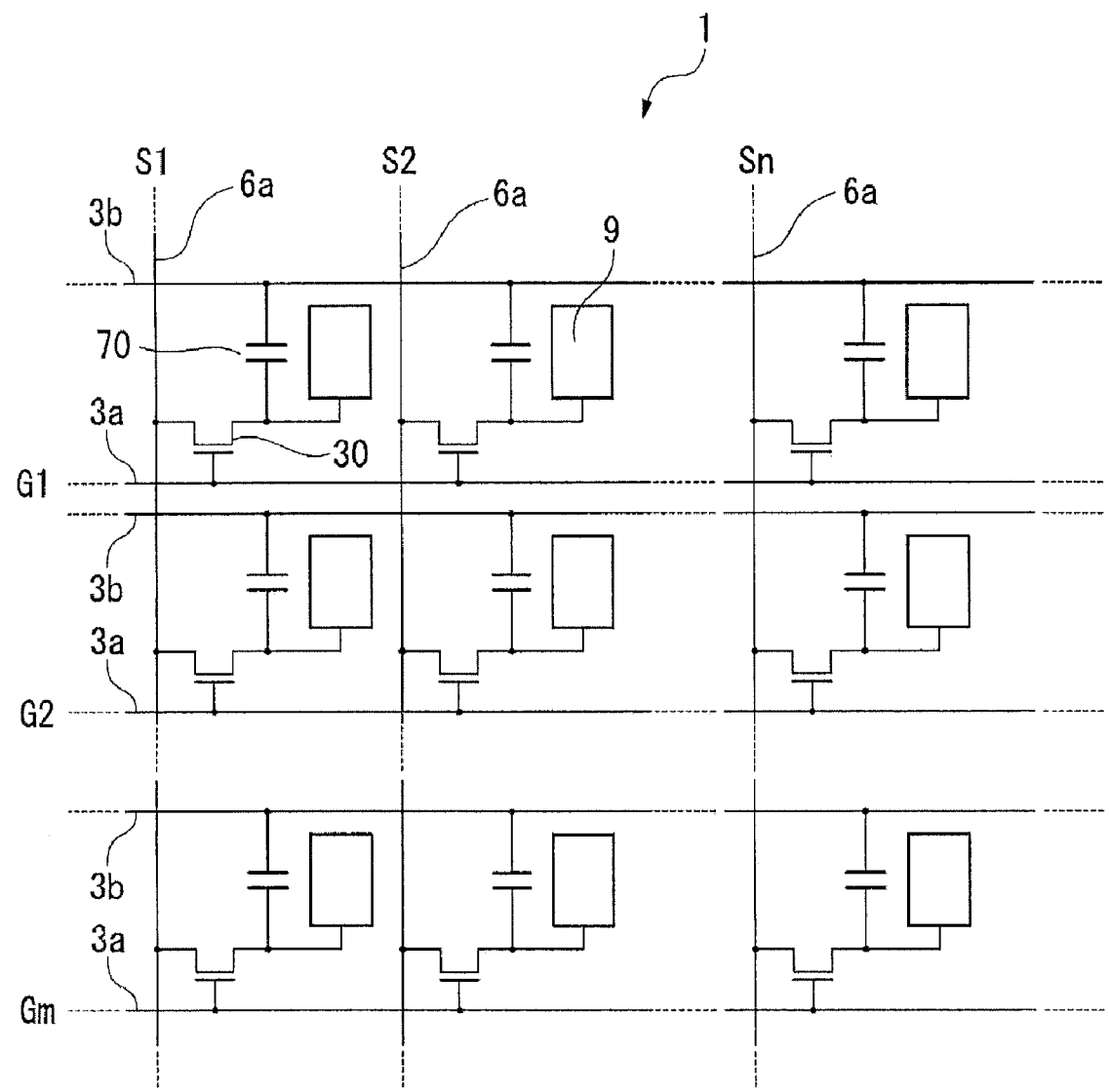
FIG. 1 is an equivalent circuit diagram of a transmission liquid crystal device 1 of one embodiment of the invention.

One embodiment of the invention will be described below with reference to the accompanying drawings with a transmission liquid crystal device of an active matrix type using thin-film transistor (TFT) elements taken as an example.

However, the technical scope of the invention is not limited to the following embodiments. In the drawings used for the following descriptions, contraction scales of parts may be suitably changed so that each part has a recognizable size.

First Embodiment

First, a liquid crystal device in a first embodiment of the invention is described.

FIG. 1 is an equivalent circuit diagram illustrating switching elements, signal lines, and other components in a plurality of pixels arranged in a matrix of a transmission liquid crystal device 1 in the present embodiment.

As illustrated in FIG. 1, a pixel electrode 9 and a TFT element 30 that serves as a switching element for controlling the power supply to the pixel electrode 9 are formed in each of a plurality of pixels arranged in a matrix, and a data line 6a to which an image signal is supplied is electrically coupled to a source of the TFT element 30.

Image signals S1, S2 . . . Sn to be written to the data lines 6a are either supplied line sequentially in this order, or supplied by group to a plurality of data lines 6a adjacent to each other.

A scan line 3a is electrically coupled to a gate of the TFT element 30, and scan signals G1, G2 . . . Gm are applied line sequentially to a plurality of scan lines 3a at a predetermined timing in a pulse manner.

The pixel electrodes 9 are electrically coupled to drains of the TFT elements 30, and writes the image signals S1, S2 . . . Sn supplied from the data lines 6a at a predetermined timing by turning on the TFT elements 30 serving as switching elements only for a certain period.

The image signals S1, S2 . . . Sn at a predetermined level written through the pixel electrodes 9 to liquid crystals are held between liquid crystals and a common electrode to be described later for a certain period.

In liquid crystals, the orientation and order of molecular aggregates vary in accordance with the applied voltage level.

This causes modulation of light, thereby enabling a gradation display.

Here, to prevent the held image signals from leaking, a storage capacitor 70 is added in parallel to a liquid crystal capacitor formed between the pixel electrode 9 and a common electrode.

Figure 2:
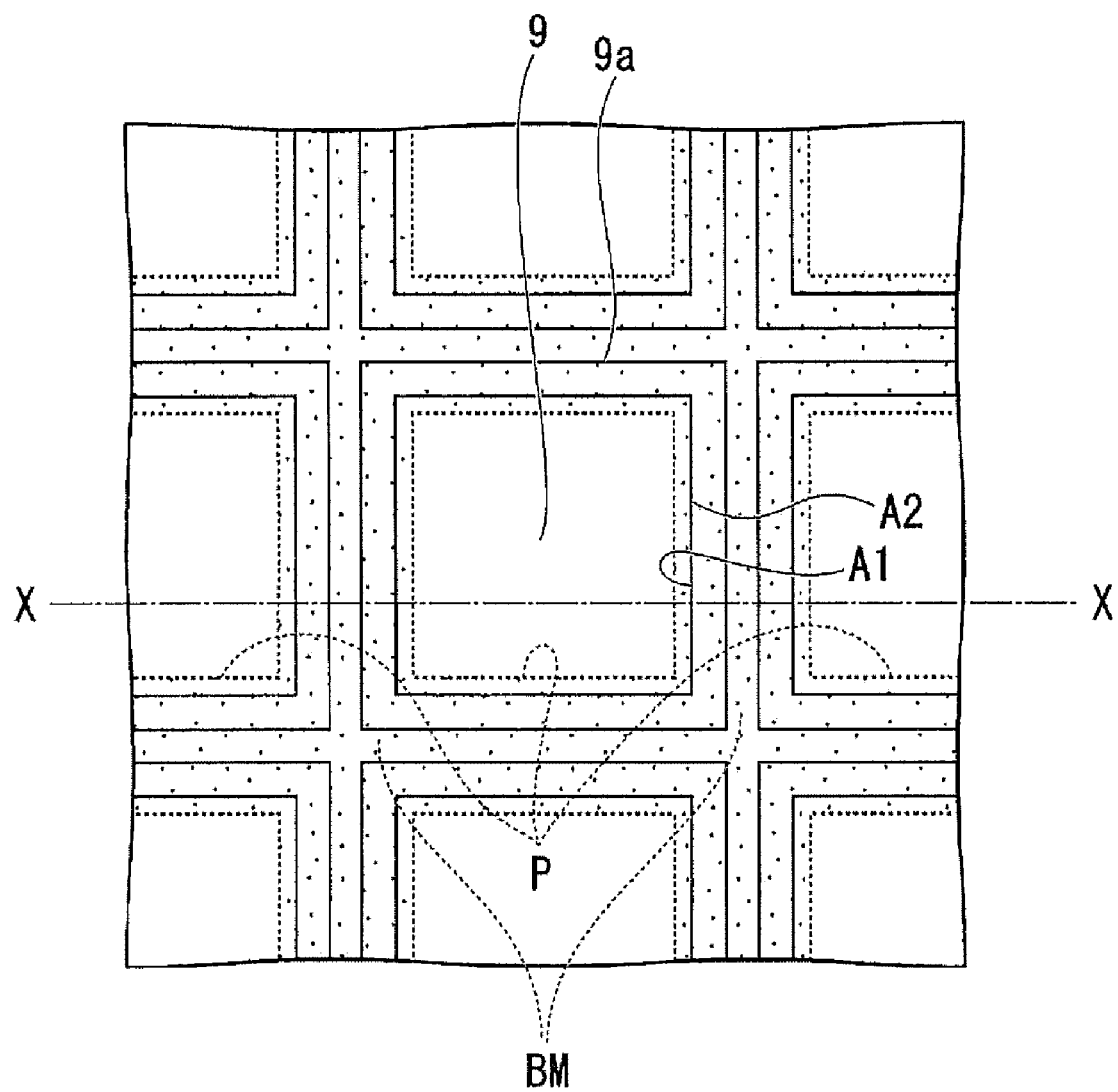
FIG. 2 is a schematic view of a main part of a display unit of the transmission liquid crystal device 1 as seen planarly.

FIG. 2 illustrates a display unit of the transmission liquid crystal device 1, and is a schematic view as seen planarly from the side of a surface having an alignment film (not illustrated) formed thereon of a first substrate on which the pixel electrodes 9 are disposed.

The display unit of the liquid crystal device consists of a display region P, which corresponds to the pixel electrode 9 (the outer perimeter thereof is denoted by reference numeral 9a) and disposed in the inside thereof, and a non-display region BM, which is a region other than the display region P.

The pixel electrode 9 is disposed such that its perimeter projects in the non-display region BM.

A first area A1 is formed to include at least the entire display region P, and a second area A2 is formed in the non-display region BM.

Figure 3:
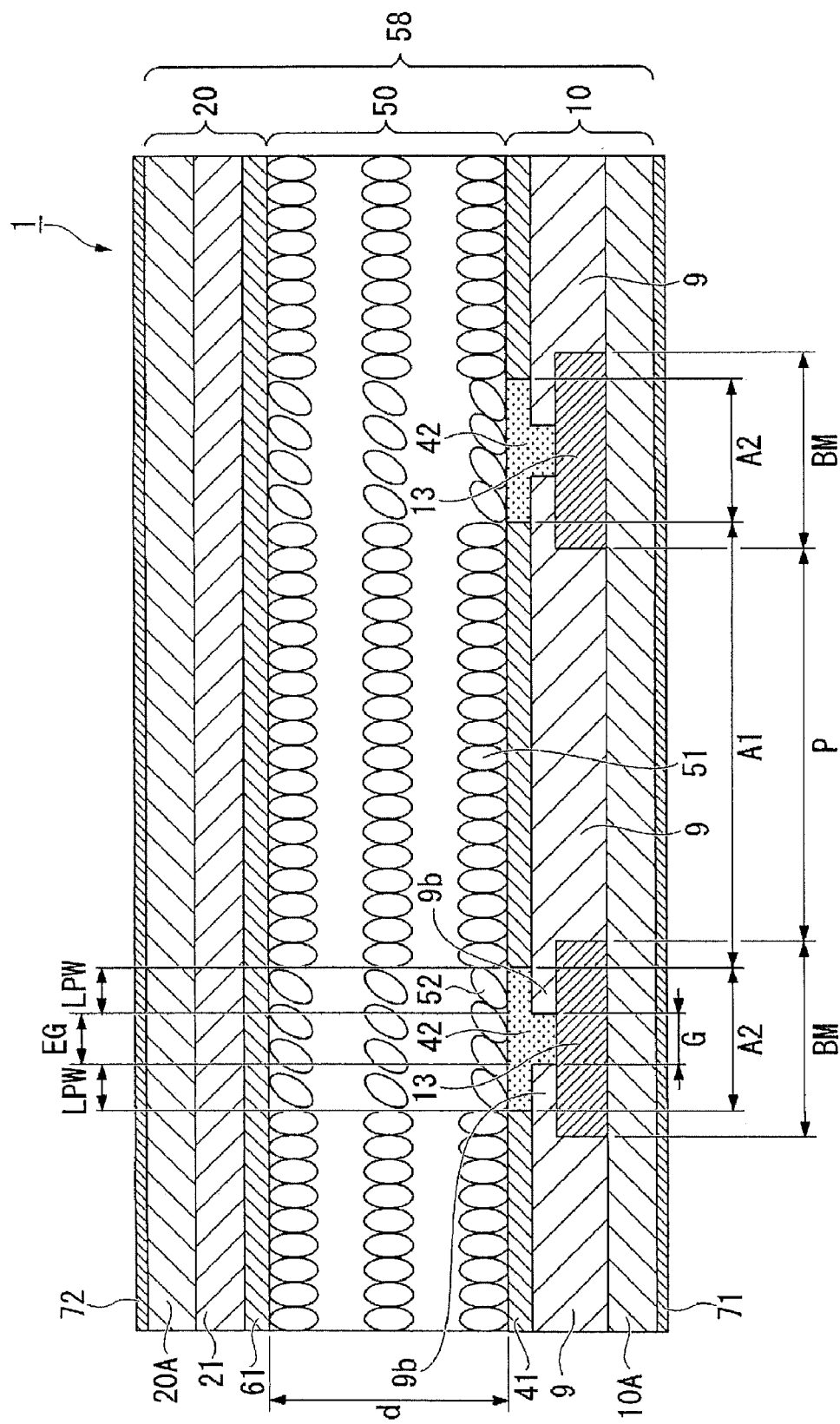
FIG. 3 is a sectional view taken along the line X-X of FIG. 2.

FIG. 3 is a schematic view of a section taken along the line X-X in FIG. 2. As illustrated in FIG. 3, the transmission liquid crystal device 1 has a liquid crystal panel 58 that includes a liquid crystal layer 50 sandwiched between a first substrate 10 and a second substrate 20.

On both sides of the liquid crystal panel 58, a pair of polarizing plates 71 and 72 are disposed in a cross-Nicol configuration, and their polarizing axes are substantially orthogonal to each other.

A light source unit, which is not illustrated, is disposed below the polarizing plate 71.

In this manner, a transmission liquid crystal device of the embodiment is configured.

The first substrate 10 includes a transparent substrate 10A made, e.g., of glass and the pixel electrodes 9 and light shielding films 13 formed on the substrate 10A, and first alignment films (vertical alignment films) 41 and second alignment films (horizontal alignment films) 42 and other components.

The foregoing element (not illustrated), wiring (not illustrated), and the like are formed on the light shielding film 13 to be prevented from deterioration caused by light being incident from the side of the substrate 10A.

The non-display region BM is defined by formation of the light shielding film 13, and the display region P is defined as a pixel opening portion between the non-display regions BM.

In the first substrate 10, the first area A1 including at least the aforementioned display region P is formed, and the second area A2 including at least part of a perimeter 9b of the pixel electrode 9, which projects in the non-display region, is formed in the non-display region BM.

As illustrated in FIG. 3, the first area A1 and the second area A2 are disposed continuously.

The first alignment film (vertical alignment film) 41 is disposed on a portion of the pixel electrode 9 corresponding to the first area A1, and the second alignment film (horizontal alignment film) 42 is disposed on the pixel electrode 9 and light shielding film 13 corresponding to the second area A2.

That is, the relationship among the widths of the non-display region BM, the second area A2, and a region G is a≧b>c, where the width of the non-display region BM is a, the width of the second area A2 is b, and the width of the region G between pixel electrodes is c.

The second substrate 20 includes a transparent substrate 20A made, e.g., of glass, a first alignment film (vertical alignment film) 61, a common electrode 21, and other components.

Note that the light shielding film 13 and the second alignment film (horizontal alignment film) 42 may be formed on the side of the second substrate 20.

The liquid crystal layer 50 is sealed between the first substrate 10 and the second substrate 20. In the initial state (with no voltage applied) illustrated in FIG. 3, liquid crystals 51 between vertical alignment films (first alignment films) 41 and 61 are aligned at an angle of approximately 90 degrees with respect to the substrate surface, and liquid crystals 52 on and above the horizontal alignment films (second alignment films) 42 are aligned at a predetermined pretilt angle LP.

Figure 4:
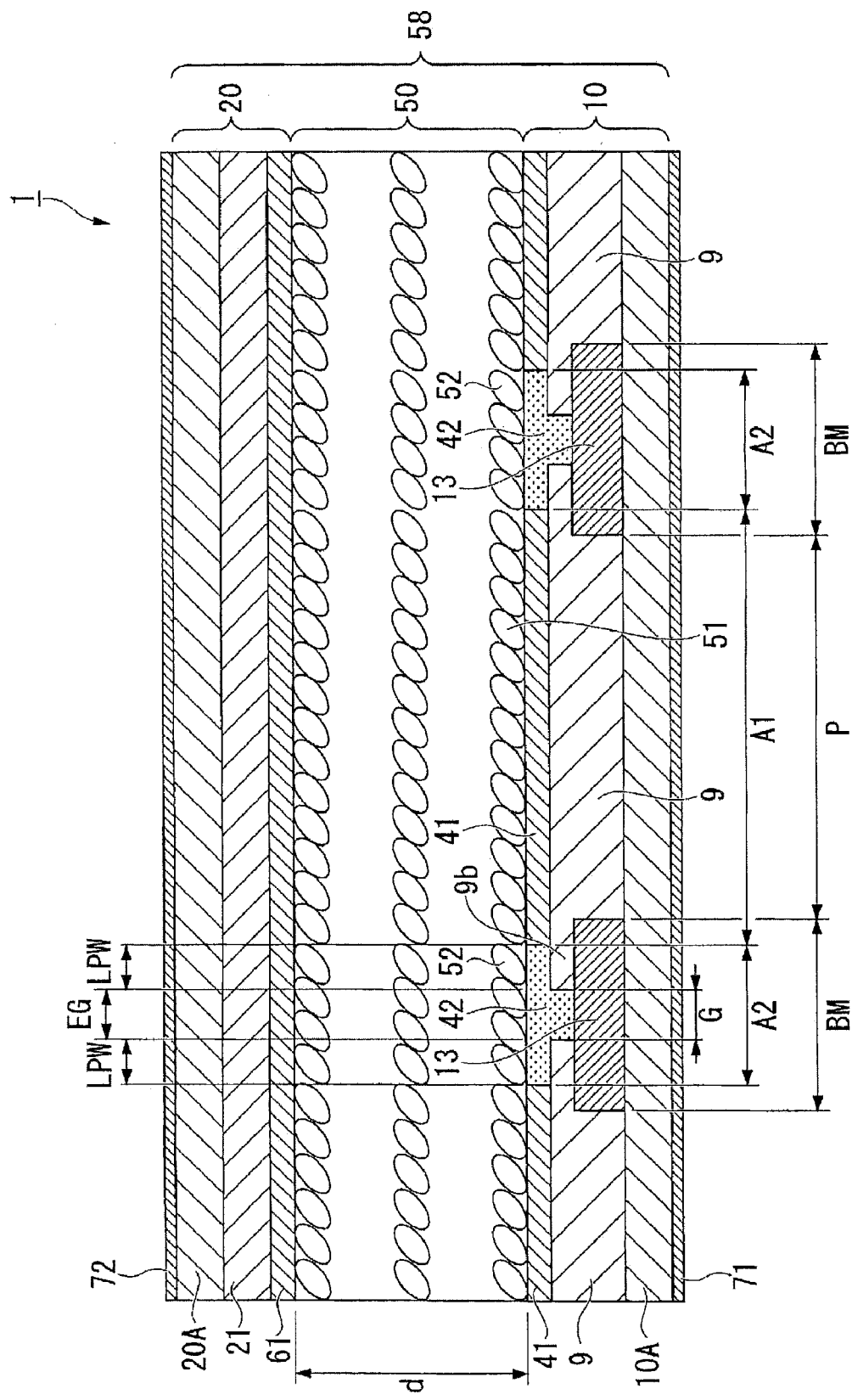
FIG. 4 schematically illustrates an orientation of liquid crystals when voltage is applied.

FIG. 4 schematically illustrates the orientation of liquid crystals when voltage is applied between the pixel electrode 9 and the common electrode 21.

When voltage is applied between the pixel electrode 9 and the common electrode 21, liquid crystals of the liquid crystal layer 50 are oriented depending on the voltage.

This orientation causes light transmitting in the thickness direction of the transmission liquid crystal device 1 to be modulated, thereby enabling gradation display.

At this point, in the transmission liquid crystal device 1 of one embodiment of the invention, since the liquid crystals 52 positioned in the second area A2 are oriented at a predetermined pretilt angle when no voltage is applied, they are oriented in such a manner as to be inclined in a uniform direction when voltage is applied. Accordingly, the liquid crystals 51 positioned in the first area A1 are inclined in a direction controlled by the liquid crystals 52, and thus are aligned to have an orientation in a constant direction.

That is, liquid crystals positioned in a portion of the first area A1 adjacent to the second area A2 are significantly affected by the operations of the liquid crystals 52 on and above the perimeter 9b of the pixel electrode 9, which constitutes an outer periphery of the second area A2.

In particular, the direction in which the liquid crystals in the first area A1 are inclined is controlled by the direction in which the liquid crystals 52 on and above the perimeter 9b are inclined.

In this way, all the liquid crystals 51 in the first area A1 are inclined in a constant direction such that they are oriented uniformly.

Therefore, if a transverse electric field is generated in a direction parallel to the first substrate 10 from an end of the pixel electrode 9, the liquid crystals 51 in the display region P can be prevented from an orientation defect.

Here, the pretilt angle LP of the liquid crystals 52 can be defined by the following expressions:

$$LP \leq A \times LPW + B \quad (1)$$

$$A = (97 - 6.5 \times d) \times EG^{(-0.58)} \quad (2)$$

$$B = 22 \times \log e(EG) + (56.7 - 12 \times d) \quad (3)$$

where $72.64 \leq A \leq 221.9$, $-8.7 \leq B \leq 42.7$, and LPW is the overlapping width of a portion of the second area A2 that projects on the perimeter 9b, EG is the distance between pixel electrodes (the width c of the region G between pixel electrodes), and d is the cell gap of the liquid crystal panel.

Figure 5A:
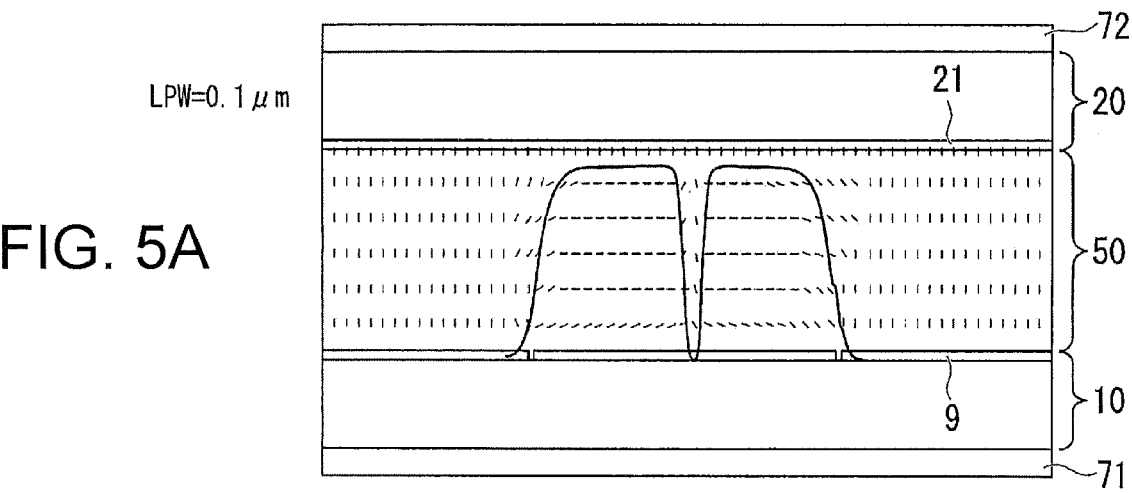
FIGS. 5A to 5C illustrate results of transmission simulations of liquid crystal devices that differ in overlapping width.
Figure 5B:
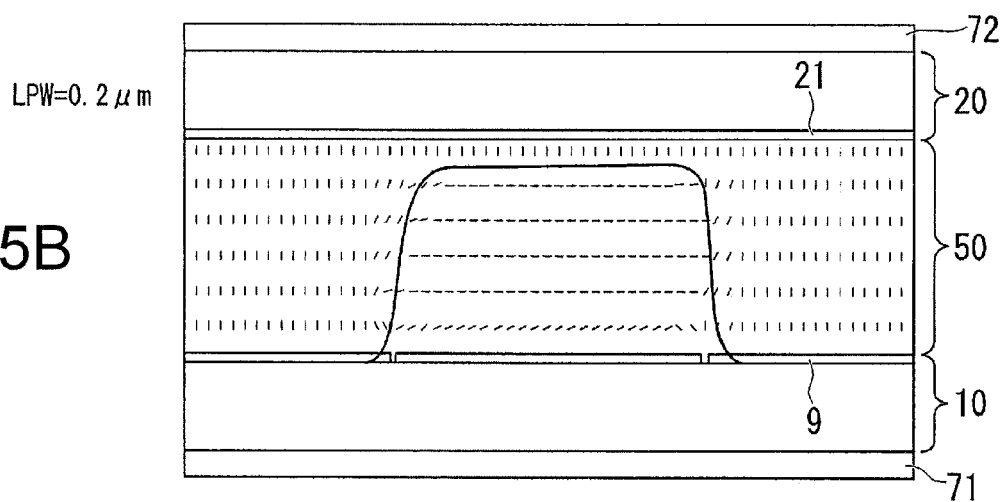
Figure 5C:
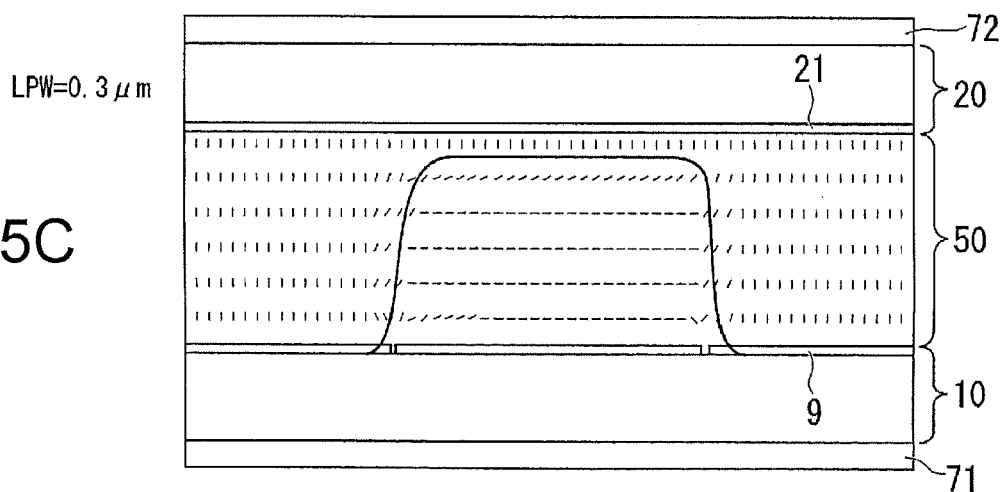

For example, results of transmission simulations for a plurality of liquid crystal devices in which the width of the non-display region BM illustrated in FIGS. 3 and 4 is 1.2 μm, the width c of the region G between pixel electrodes is 0.2 μm, and the overlapping widths LPW are 0.1 μm, 0.2 μm, and 0.3 μm are illustrated in FIGS. 5A to 5C.

In FIGS. 5A to 5C, the state of light being transmitted through one pixel with voltage applied is illustrated.

As illustrated in FIG. 5A, if the overlapping width LPW is 0.1 μm, disclination occurs approximately at the center of the pixel.

As illustrated in FIGS. 5B and 5C, on the other hand, no disclination occurs if the overlapping width LPW is 0.2 μm or more.

Therefore, in the configuration conditions described above, occurrence of disclination can be prevented by setting an overlapping width LPW of 0.2 μm or more.

Further, when the correlation of the width a of the non-display region BM and the width b of the second area A2 are calculated from the distribution of light leakage, the width b (μm) of the second area A2 is b≦a−0.4, and more preferably b≦a−0.8.

It is found that the latter had higher effect on the prevention of light leakage.

Accordingly, the width b of the second area A2 is defined in the range mentioned below.

(The width c of the region G between pixel electrodes)+0.4≦(the width of the second area A2)≦(the width a of the non-display region BM)−0.4

If the configuration of the liquid crystal device 1 is under the conditions mentioned above, the width b of the second area A2 may be within the range of 0.6 to 0.8 μm.

Note that the upper limit of the pretilt angle LP varies in accordance with the relations with the width a of the non-display region BM, the width c of the region G between pixel electrodes (distance EG between the electrodes), the overlapping width LPW, the cell gap d, and the like.

Details will be described later.

In this way, the direction in which the liquid crystals 52 are inclined when voltage is applied is sufficiently controlled.

This further ensures prevention of an orientation defect of the liquid crystals 51.

To impart the pretilt angle in the range mentioned above to the liquid crystals 52, publicly known methods using the horizontal alignment film 42 may be used.

Since the liquid crystals 52 that have orientation different from that of the liquid crystals 51 corresponding to the display region P are disposed only in the non-display region BM, the transmittance of a pixel corresponding to the display region (pixel opening portion) P is defined only by the liquid crystals 51 and therefore is uniform.

Thus, a desired transmittance of the pixel can be obtained.

The liquid crystals 51 corresponding to the display region P can be oriented approximately vertically with no voltage applied.

Manufacturing Method

Next, one embodiment of a method for manufacturing a liquid crystal device according to the invention is described.

In the present embodiment, description is given taking as an example the following method.

That is, photosensitive resin is used as a material for the horizontal alignment film 42, and a pattern is transferred using the light shielding film 13 as a mask to form the horizontal alignment film 42.

FIGS. 6A to 6C and 7A to 7C are explanatory views of processes of forming the first substrate 10.

Figure 6A:
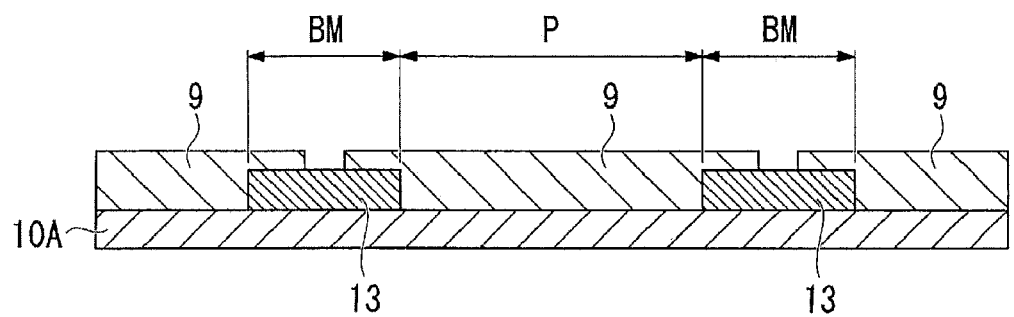
FIGS. 6A to 6C are explanatory views of a manufacturing method of a liquid crystal device according to one embodiment of the invention.

First, as illustrated in FIG. 6A, the light shielding films 13 made, e.g., of Cr (chrome) are formed in a lattice pattern on the transparent substrate 10A made, e.g., of glass.

The light shielding films 13 define the non-display regions BM, and an area surrounded by the non-display regions BM is referred to as the display region (pixel opening portion) P.

Subsequently, the TFT element 30 and the data line 6a, scan line 3a, and the like illustrated in FIG. 1 are formed on each light shielding film 13.

Then, the pixel electrode 9 is formed by using a transparent conductor made e.g., of indium tin oxide (ITO) such that the pixel electrode 9 projects from the display region P into the non-display region BM.

Thus, a precursor that is to be the first substrate 10 is formed. Publicly known methods may be used for these processes.

Figure 6B:
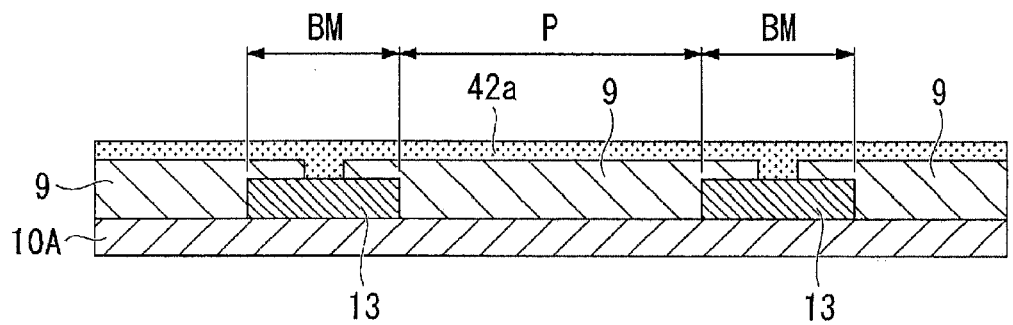

Next, as illustrated in FIG. 6B, a material for horizontal alignment films (second alignment films), which will be described later, is applied onto the side of the pixel electrode 9 of the first substrate 10 using a method such as spin coating to form a photosensitive resin film 42a.

For example, posi-type photosensitive polyimide (positive PI) is used as the material for horizontal alignment films.

For example, the thickness of the photosensitive resin film 42a is about 100 nm.

Note that a "first substrate" in the invention includes the state of its precursor for the sake of convenience.

Figure 6C:
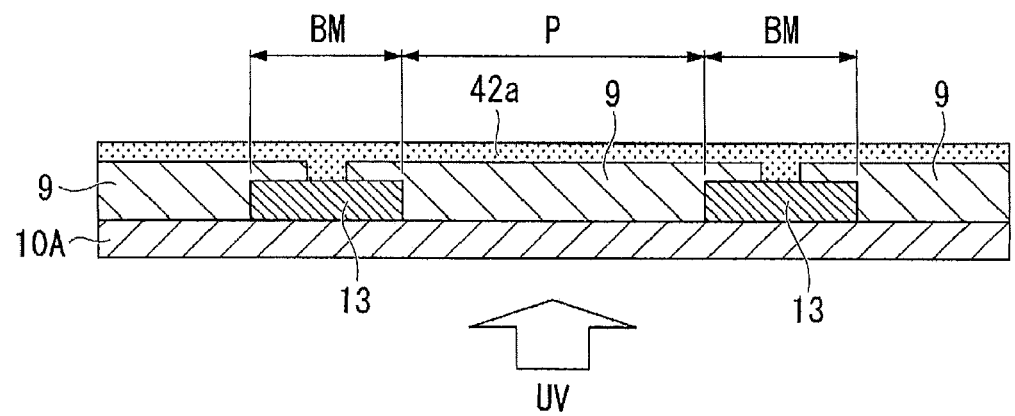

Subsequently, as illustrated in FIG. 6C, UV rays are applied from the back surface (the side opposite to the foregoing surface coated with the positive PI) of the substrate 10A so that a predetermined amount of exposure is performed.

At this point, since the substrate 10A and the pixel electrode 9 are made of transparent materials, UV rays penetrate in the display region P corresponding to these components so that UV solubilizing polyimide on the display region P is exposed to the UV rays to be solubilized.

On the other hand, UV rays do not penetrate in the non-display regions BM corresponding to the light shielding films 13, and therefore portions of the photosensitive resin film 42a positioned corresponding to the non-display regions BM are not exposed to the UV rays.

After the processes as described above, solubilized (exposed to UV rays) portions of the photosensitive resin film 42a are removed (developed) by wet etching, and heated, e.g., at a temperature of about 200° C. for about 1 hour.

Figure 7A:
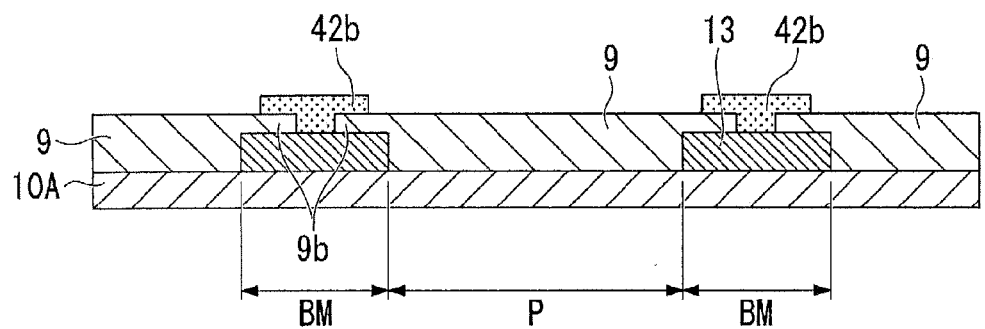
FIGS. 7A to 7C are explanatory views of a manufacturing method of a liquid crystal device according to one embodiment of the invention.

By this means, as illustrated in FIG. 7A, photosensitive resin films 42b corresponding to the non-display regions BM are formed.

The sizes (widths) of the photosensitive resin films 42b are controllable by the angle of UV rays being incident on the first substrate 10A, exposure time, developing time, etc.

However, since the photosensitive resin film 42a is exposed to UV rays (self-patterning) using the light shielding films 13 as masks, the photosensitive resin films 42b are formed at least within the non-display regions BM.

Figure 7B:
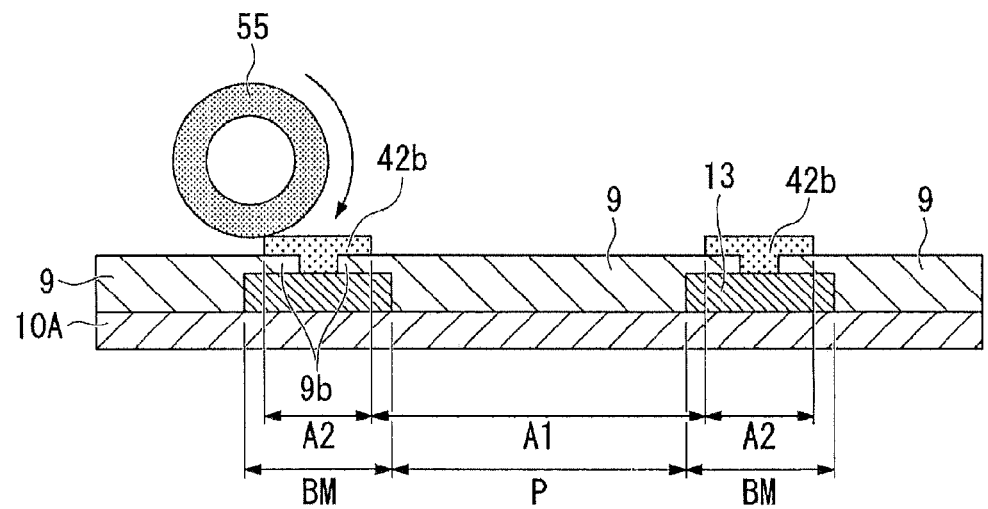

Next, as illustrated in FIG. 7B, the photosensitive resin films 42b are rubbed by rubbing device 55 with rubbing cloth wound on a roller, thereby imparting orientation to the photosensitive resin films 42b.

The horizontal alignment films (second alignment films) 42 corresponding to the non-display regions BM are thus formed.

Formation of the horizontal alignment films 42 allows the second areas A2 to be formed for the horizontal alignment films 42.

An area between the second areas A2 is defined as the first area A1.

After the horizontal alignment films 42 are formed as described above, the vertical alignment films (first alignment films) 41 are formed above the substrate 10A above which the horizontal alignment films 42 have been formed.

To form the vertical alignment films 41, for example, there is a method of selectively providing a long chain alkyl group and a functional group having a rigid planar structure onto the pixel electrode 9 exposed between the horizontal alignment films 42.

Specifically, for the first substrate 10 in which the horizontal alignment films 42 are formed, drying is performed, e.g., in an N2 atmosphere at temperatures from about 150 to about 180° C. for about 3 hours.

Then, the substrate 10A having the horizontal alignment films 42 is left, together with a container having an octadecyltrimethoxysilane (ODS) solution, in a closed vessel.

By heating this vessel, e.g., at a temperature of 150° C. for about 1 hour, the steam of the ODS solution is brought into contact with the surface of the substrate 10A on which the pixel electrodes 9 are placed.

In this way, because the long chain alkyl group of the ODS molecule has an inorganic reaction group, the long chain alkyl group is selectively bonded onto the pixel electrodes 9 made of ITO, which is an inorganic material, without being bonded with the organic material for the horizontal alignment films 42.

Accordingly, the vertical alignment films 41 can be selectively formed on the pixel electrodes 9 exposed between the horizontal alignment films 42.

Figure 7C:
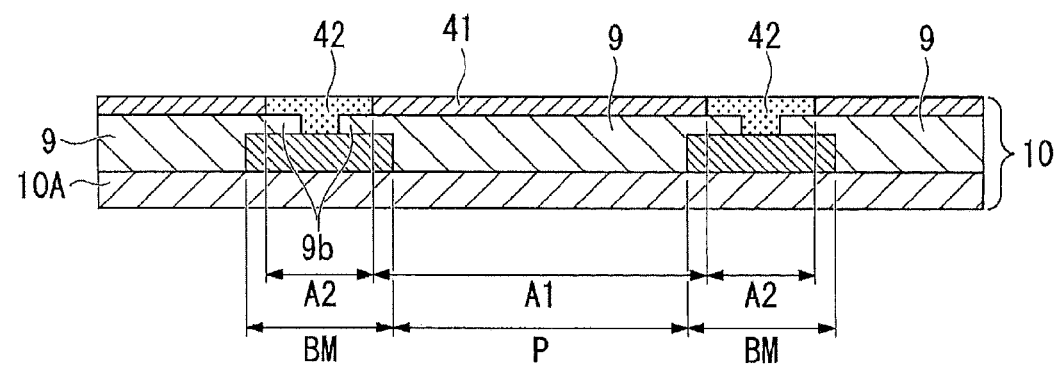

As described above, the first substrate 10 having the vertical alignment film 41 in the first area A1 and the horizontal alignment film 42 in the second area A2, as illustrated in FIG. 7C, is obtained.

Figure 8A:
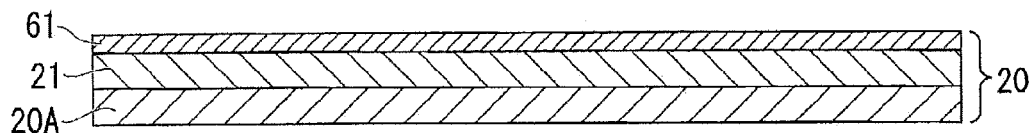
FIGS. 8A to 8C are explanatory views of a manufacturing method of a liquid crystal device according to one embodiment of the invention.

Apart from the formation of the first substrate 10, the second substrate 20 is formed as illustrated in FIG. 8A. In the second substrate 20, the common electrode 21 is formed using a transparent conductor made, e.g., of ITO on the substrate 20A made, e.g., of glass, and a vertical alignment film 61 is formed on the common electrode 21.

Publicly known methods may be used for these processes.

For example, an evaporation method is preferably used for formation of the common electrode 21 and spin coating for formation of the vertical alignment film 61.

Figure 8B:
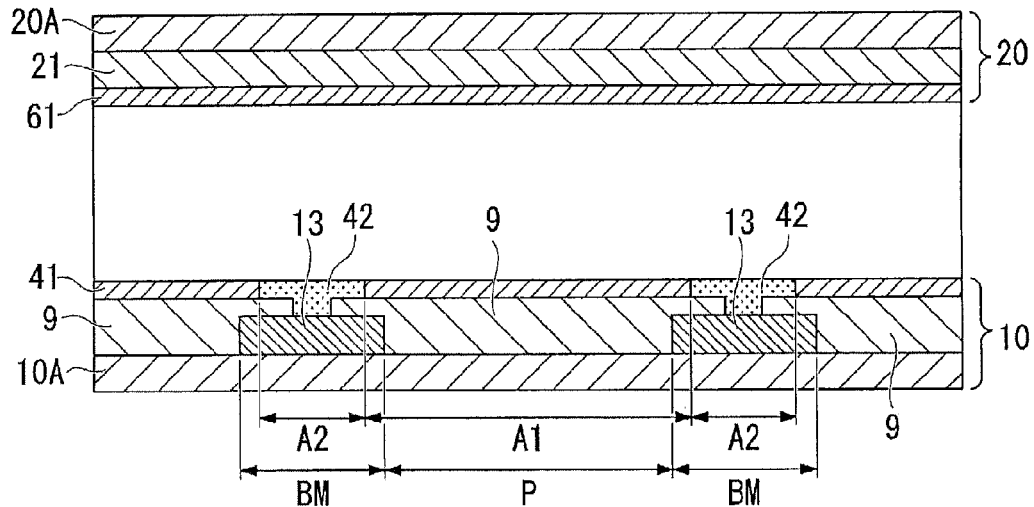

Next, as illustrated in FIG. 8B, the first substrate 10 and the second substrate are bonded together such that the first alignment films 41 and 61 and the second alignment films 42 are positioned inside.

Figure 8C:
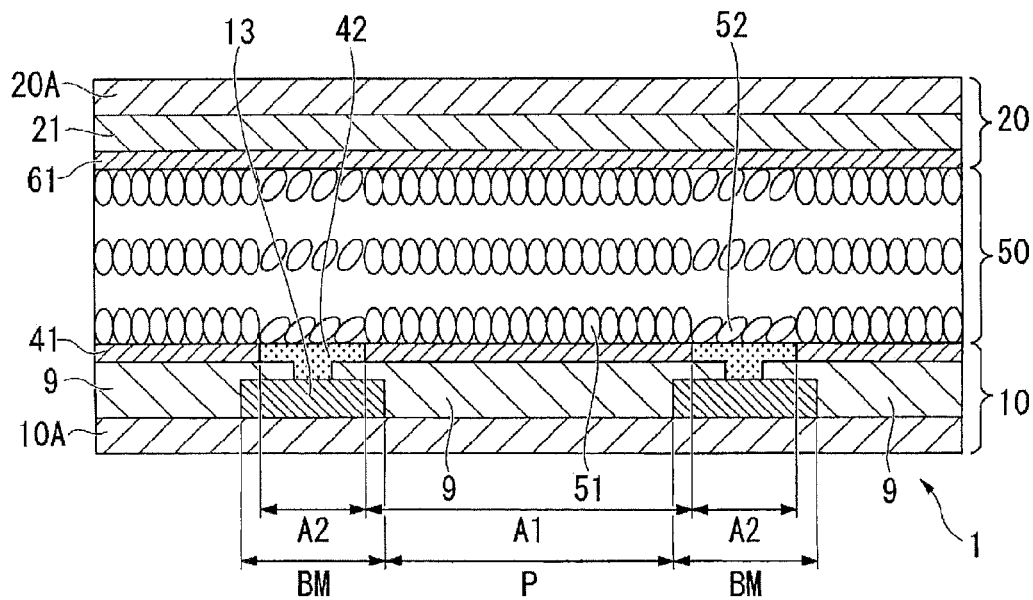

The liquid crystal layer 50 is encapsulated between the first substrate 10 and the second substrate 20 as illustrated in FIG. 8C.

Thus, the transmission liquid crystal device 1 is formed.

According to a manufacturing method as described above, horizontal alignment films are formed by self-alignment using the light shielding films 13 as the masks.

Accordingly, it is not necessary to separately use a resist mask and the like.

This allows the manufacturing processes to be simplified.

The horizontal alignment films 42 are never formed to stick out in the display regions P because they are to be formed within the non-display regions BM defined by the light shielding films 13.

Accordingly, the transmission liquid crystal device 1 can be manufactured in which only the vertical alignment films 41 and 61 are formed in the display regions P.

In the liquid crystal device (transmission liquid crystal device) 1 of one embodiment of the invention obtained by the above manufacturing method, an orientation defect of the liquid crystals 51 in the display region P is prevented, and therefore a display defect such as a disclination is prevented.

The liquid crystals 51 corresponding to the display region P can be oriented approximately vertically with no voltage applied, and therefore have good contrast characteristics.

It is prevented that liquid crystals oriented horizontally are disposed in the display region, and therefore reduction of display contrast is prevented.

While the light shielding film 13 is independently formed using Cr or the like in the embodiment, a wiring electrode and the like may function as the light shielding film 13.

As a method for forming the vertical alignment film 41, the following processes may be employed.

That is, after the horizontal alignment film 42 is formed, a solvent containing, e.g., polysiloxane is applied onto the side of the surface with the formed horizontal alignment films 42 of the first substrate by a liquid phase method such as spin coating.

The applied solvent is cured at a temperature of about 200° C., thereby forming the vertical alignment film 41.

If the vertical alignment film 41 is a film that is made of such an inorganic material as the above polysiloxane and has a rigid structure, orientation is not imparted to the vertical alignment film 41 by rubbing.

The process of rubbing the photosensitive resin film 42b illustrated in FIG. 7B may therefore be carried out at one time for the vertical alignment film 41 as well as the photosensitive resin film 42b after the vertical alignment film 41 is formed.

Examples will be described below with reference to FIGS. 9 to 17 while referring to FIGS. 3 and 4 of the drawings in the above embodiment.

FIRST EXAMPLE

In this example, transmission simulations were performed for a plurality of liquid crystal devices that differed from one another in the pretilt angle LP ranging from 12 to 15 degrees under the conditions that the distance EG between pixel electrodes was 0.2 μm, the overlapping width of a portion of the second area A2 that projected on the perimeter 9b was 0.1 μm, and the cell gap d of the liquid crystal panel was 2.5 μm.

FIGS. 9 to 12 illustrate the results of the transmission simulations for liquid crystal devices.

Figure 9:
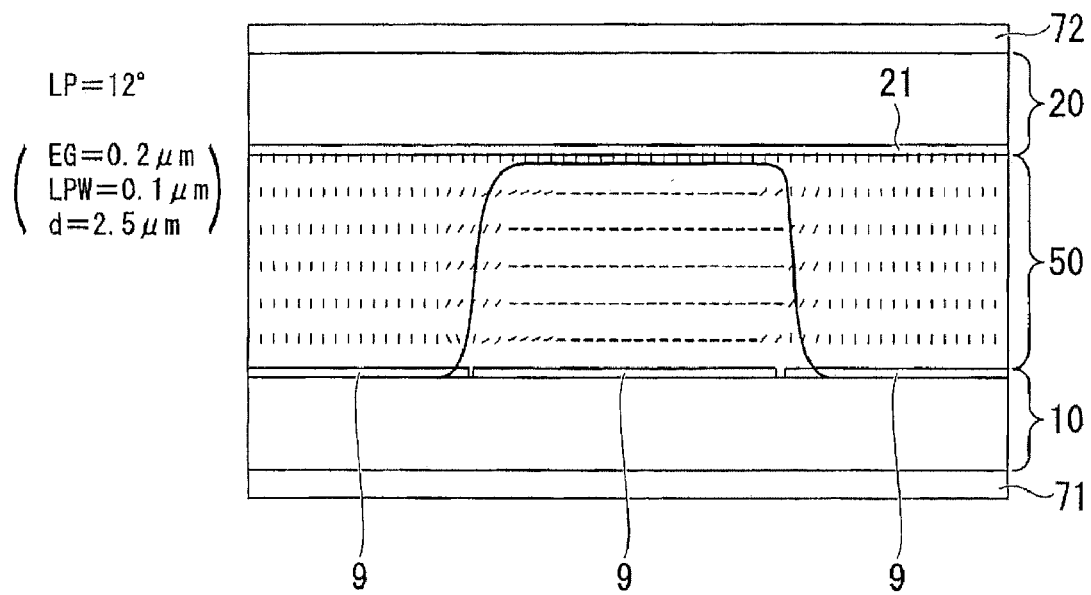
FIG. 9 illustrates a result of a transmission simulation of a liquid crystal device (pretilt angle of 12 degrees).

As illustrated in FIG. 9, in the case of a pretilt angle LP of 12 degrees, a disclination did not occur in a pixel (display region P) and a sufficient transmittance was obtained in the pixel.

Figure 10:
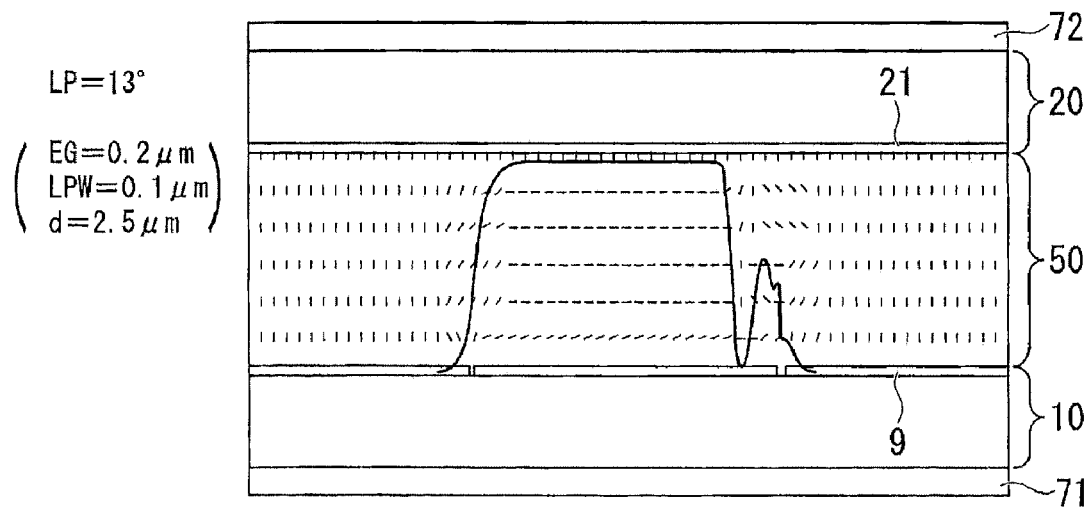
FIG. 10 illustrates a result of a transmission simulation of a liquid crystal device (pretilt angle of 13 degrees).
Figure 11:
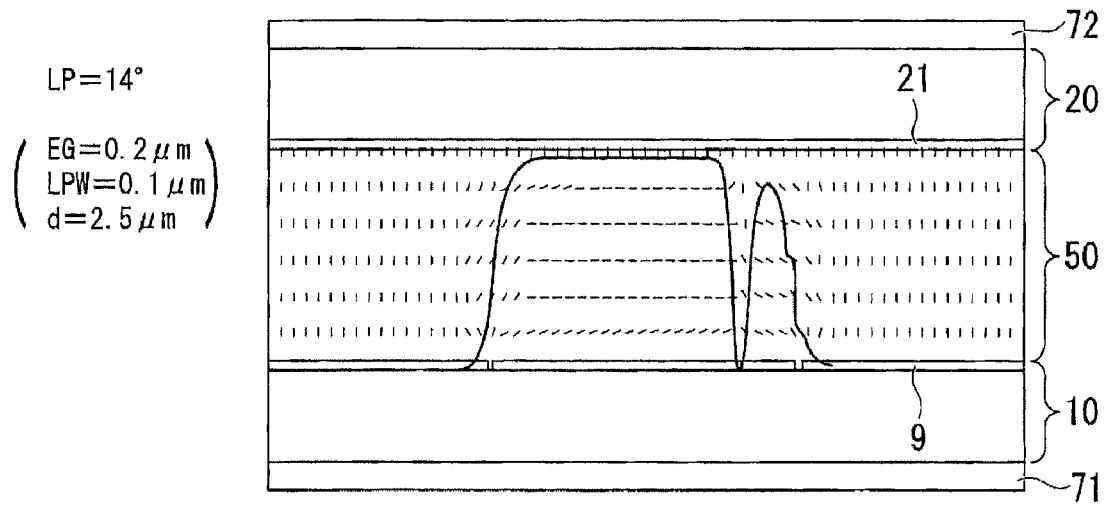
FIG. 11 illustrates a result of a transmission simulation of a liquid crystal device (pretilt angle of 14 degrees).
Figure 12:
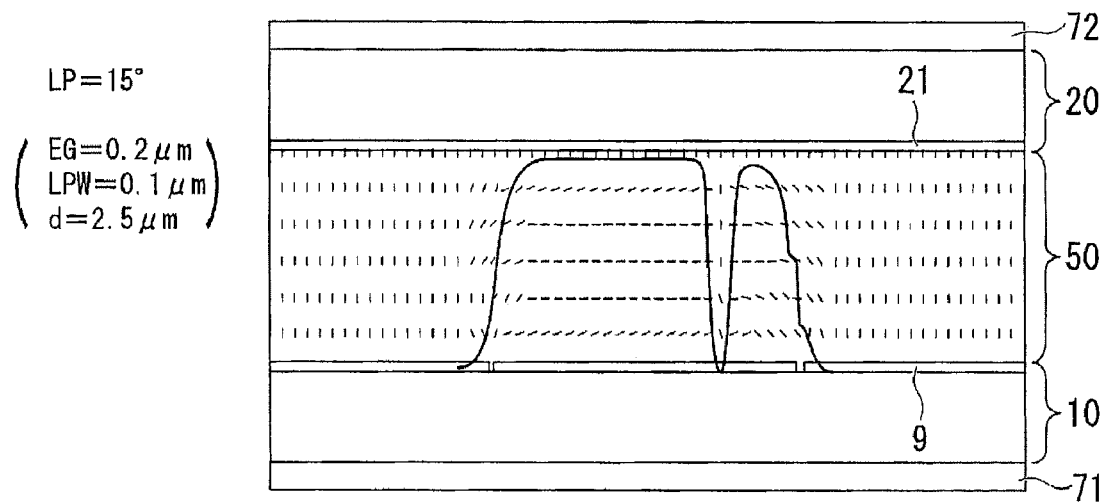
FIG. 12 illustrates a result of a transmission simulation of a liquid crystal device (pretilt angle of 15 degrees).

However, as illustrated in FIGS. 10 to 12, it was found that a disclination occurred from an end of the pixel if the pretilt angle LP of the liquid crystals 52 exceeded 12 degrees.

It was found that the place where a disclination occurred varied depending on the pretilt angle LP.

As the pretilt angle LP increased, the place of disclination occurrence moved towards inside of the pixel to increase the area of an orientation defect.

As illustrated in FIG. 10, in the case of a pretilt angle LP of 13 degrees, a disclination occurred in the vicinity of an end of the pixel.

However, as illustrated in FIGS. 11 and 12, it was found that as the pretilt angle LP increased, the place of disclination occurrence moved toward the inside of the pixel and the transmittance of leaking light in the end of the pixel increased.

SECOND EXAMPLE

In this example, transmission simulations were performed under the condition that the distance EG between pixel electrodes was 1.2 μm.

Figure 13:
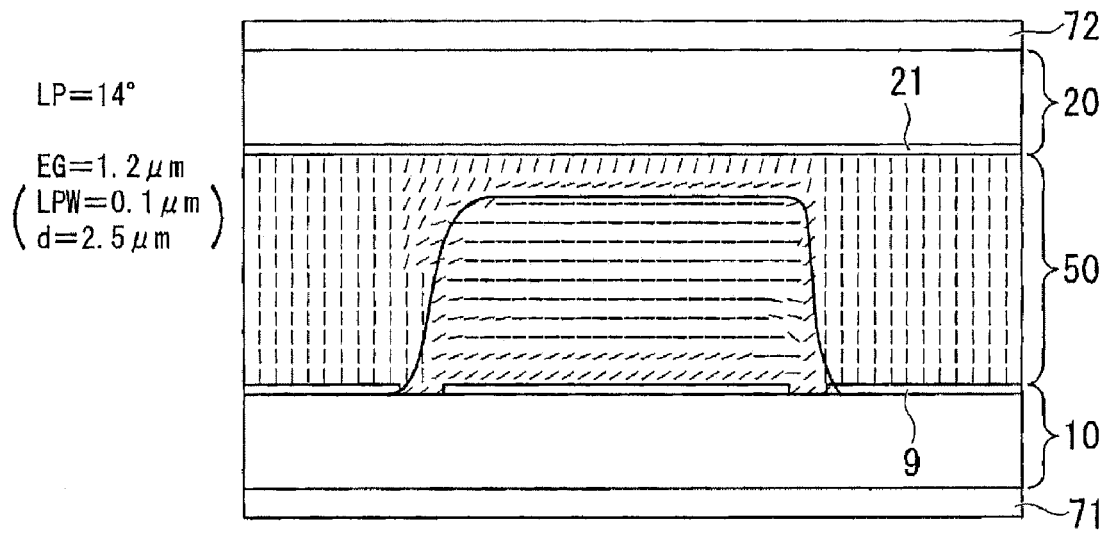
FIG. 13 illustrates a result of a transmission simulation of a liquid crystal device that differs from the liquid crystal device of FIG. 11 only in the distance between pixel electrodes.

FIG. 13 illustrates the result of the transmission simulation for a liquid crystal device having a pretilt angle LP of 14 degrees.

In the configuration of the above first example, if the pretilt angle LP exceeded 12 degrees, a disclination occurred.

However, as illustrated in FIG. 13, if the distance EG between pixel electrodes was 1.2 μm, a disclination did not occur in the case of a pretilt angle LP of 14 degrees.

Figure 14:
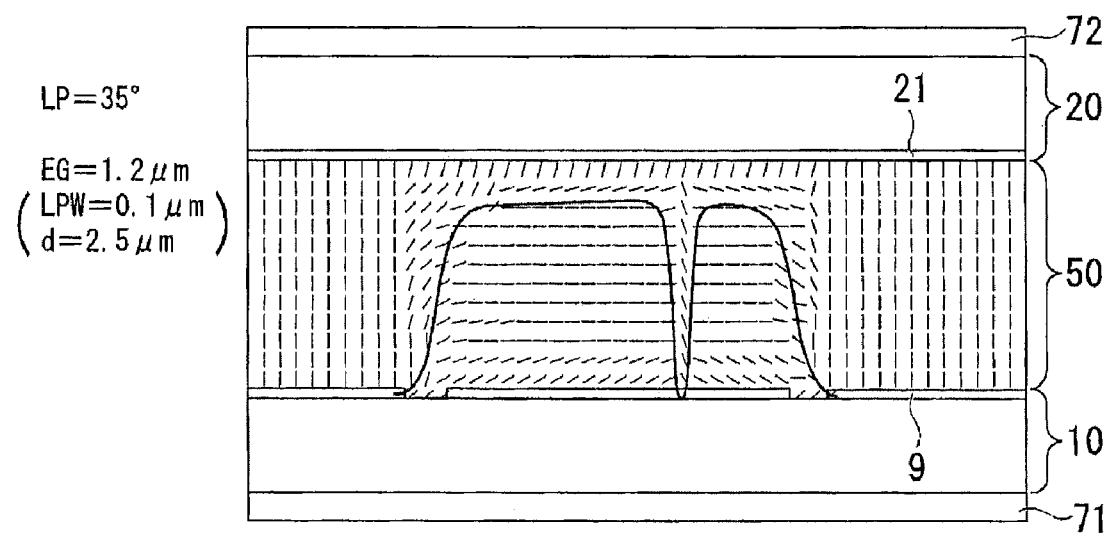
FIG. 14 illustrates a result of a transmission simulation of a liquid crystal device (pretilt angle of 35 degrees).

Further, when a transmission simulation was performed for a liquid crystal device having a pretilt angle LP larger than 14 degrees, a disclination occurred in the case of a pretilt angle LP of 35 degrees as illustrated in FIG. 14.

In other words, it was found that as the distance EG between pixel electrodes increased, the upper limit of a desired pretilt angle LP increased.

THIRD EXAMPLE

Next, transmission simulations were performed for more precise liquid crystal devices.

In this example, transmission simulations were performed for a plurality of liquid crystal devices that differed from one another in the cell gap d (d=1.5 μm, 2.0 μm, and 2.5 μm) under the conditions that the distance EG between pixel electrodes was 0.05 μm, the overlapping width LPW was 0.2 μm, and the pretilt angle LP was 12 degrees.

Figure 15:
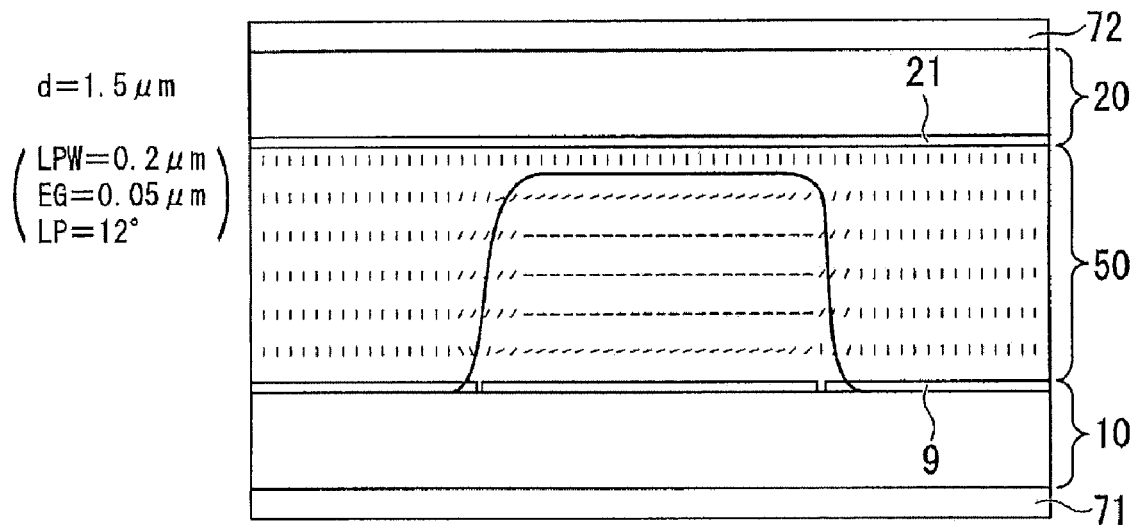
FIG. 15 illustrates a result of a transmission simulation of a liquid crystal device (cell gap d of 1.5 μm).
Figure 16:
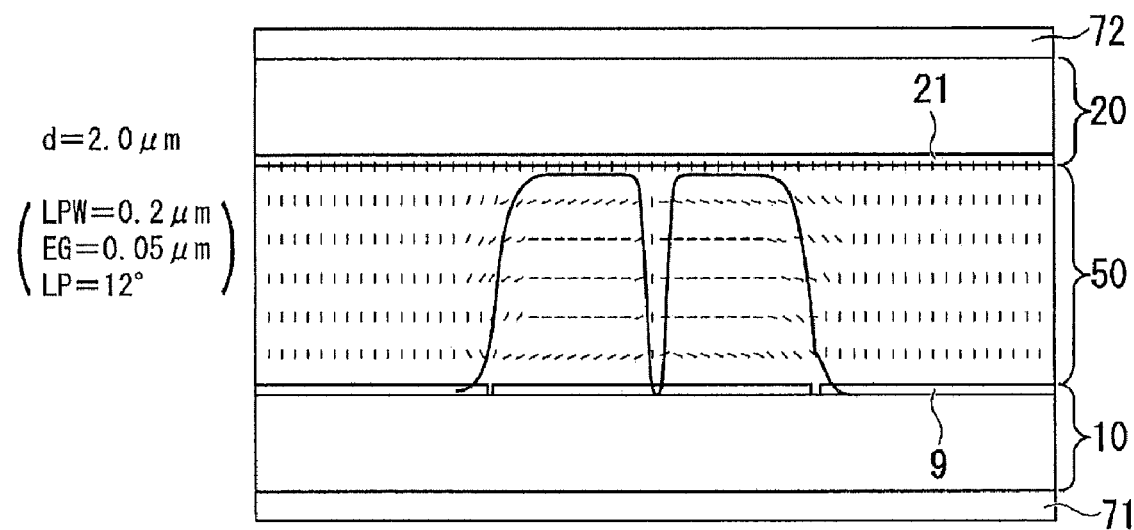
FIG. 16 illustrates a result of a transmission simulation of a liquid crystal device (cell gap d of 2.0 μm).
Figure 17:
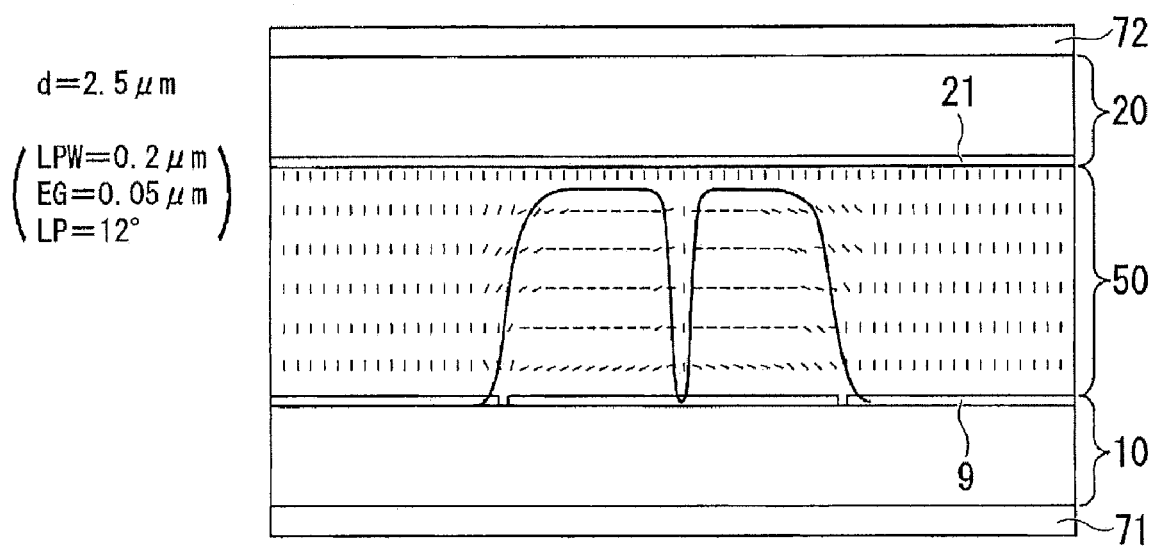
FIG. 17 illustrates a result of a transmission simulation of a liquid crystal device (cell gap d of 2.5 μm).

FIGS. 15 to 17 illustrate the results of the transmission simulations for these liquid crystal devices.

As illustrated in FIG. 15, in the case of a cell gap d of 1.5 μm, a disclination did not occur.

However, as illustrated in FIGS. 16 and 17, it was found that if the cell gap d was 2.0 μm or more, a disclination occurred approximately at the center of the pixel.

In FIG. 15, since the vertical electric field intensity increases as compared to a liquid crystal device having a large cell gap d as illustrated in FIGS. 16 and 17, the direction in which the liquid crystals 52 are inclined is sufficiently controlled so that an orientation defect of the liquid crystals 51 is prevented.

This means that even in the configuration where the liquid crystals 52 do not have a uniaxial orientation (e.g., in the case where the pretilt angle LP is large), a uniaxial orientation of the liquid crystals 52 is achieved by setting the cell gap d small.

Optimum Value in Each Configuration

The optimum values of constituent members of a liquid crystal device are described with reference to FIGS. 18A to 18C.

The aforementioned expressions (1) to (3) are ones derived based on the results of a plurality of transmission simulations that are performed with the values of constituent members changed.

Figure 18A:
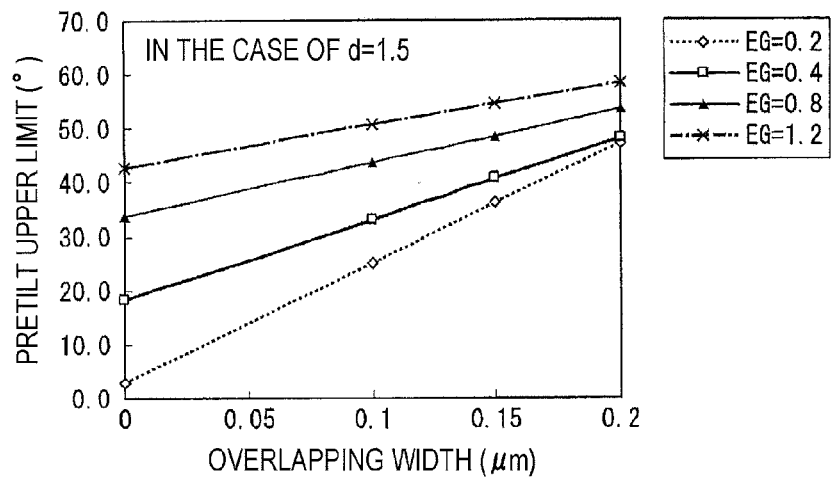
FIGS. 18A to 18C are graphs illustrating the upper limit of a pretilt angle LP for each configuration.
Figure 18B:
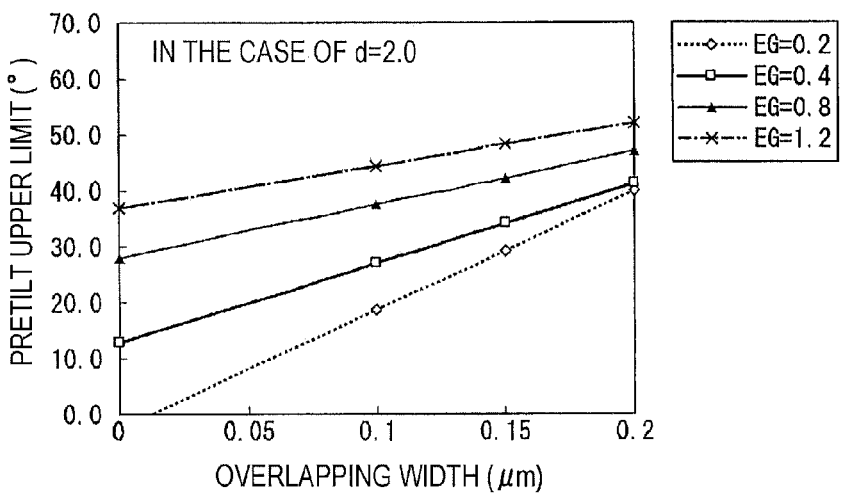
Figure 18C:
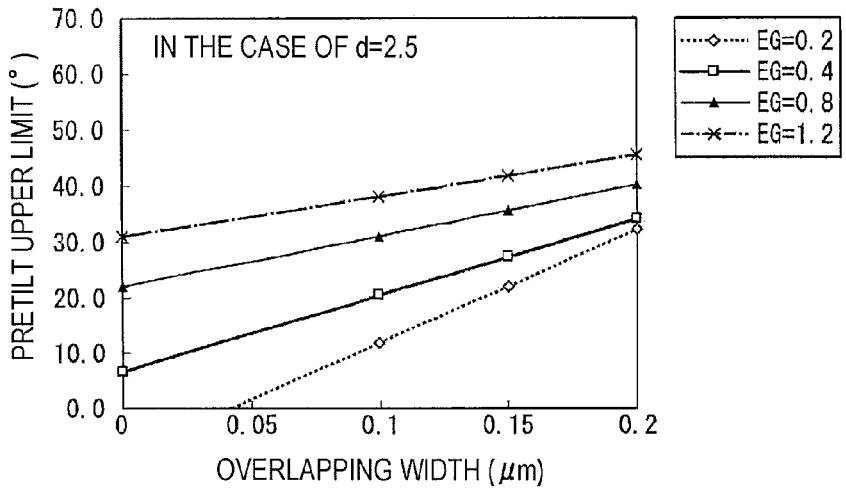

FIGS. 18A to 18C are graphs illustrating upper limits of the pretilt angles LP calculated using the expression (1) for each configuration.

FIGS. 18A, 18B, and 18C are graphs for liquid crystal devices having cell gaps d of 1.5 µm, 2.0 µm, and 2.5 µm, respectively.

FIGS. 18A, 18B, and 18C each illustrate relationships between the overlapping width LPW and the pretilt angle LP in cases of different distances EG between pixel electrodes (EG=0.2, 0.4, 0.8, and 1.2)

Here, the upper limit of the pretilt angle LP means the threshold value of the pretilt angle under which no disclination occurs.

As illustrated in FIGS. 18A to 18C, the upper limit of the pretilt angle LP varies depending on the configuration.

In each figure, in any cell gap d, as the distance EG between pixel electrodes increases, the upper limit of the pretilt angle LP increases.

Further, focusing attention on the overlapping width LPW, as the overlapping width LPW increases, the upper limit of the pretilt angle LP increases.

Therefore, by setting the overlapping width LPW in accordance with the cell gap d and the distance EG between pixel electrodes, the orientation direction of liquid crystals in a display region is sufficiently controlled.

As illustrated in FIGS. 18A to 18C, the narrower the cell gap d, the larger the upper limit of the pretilt angle LP is regardless of the distance EG between pixel electrodes and the overlapping width LPW.

As apparent from FIGS. 18A and 18C, the tolerance of the pretilt angle LP in the case of a cell gap d of 1.5 µm is larger than that in the case of a cell gap d of 2.5 µm.

That is, if the value of the overlapping width LPW with respect to the distance EG between pixel electrodes is not proper, e.g., too large (exceeding the upper limit of the pretilt angle LP), the cell gap d is reduced so that the pretilt angle LP is within the tolerance, eliminating an orientation defect of the liquid crystal.

As described above, it has been found that (distance EG between pixel electrodes, the overlapping width LPW, cell gap d, etc.,) of a liquid crystal device according to one embodiment of the invention are properly set within the tolerance of the pretilt angle LP based on the relationships illustrated in FIGS. 18A to 18C, preventing occurrence of a disclination in the display region.

Thus, a liquid crystal device can be obtained that has a good contrast characteristics and in which the display defect is prevented.

Second Embodiment

Next, a transmission liquid crystal device in a second embodiment of the invention is described.

In the present embodiment, the same components as in the first embodiment are indicated by the same reference numerals, and descriptions thereof are omitted.

Figure 19:
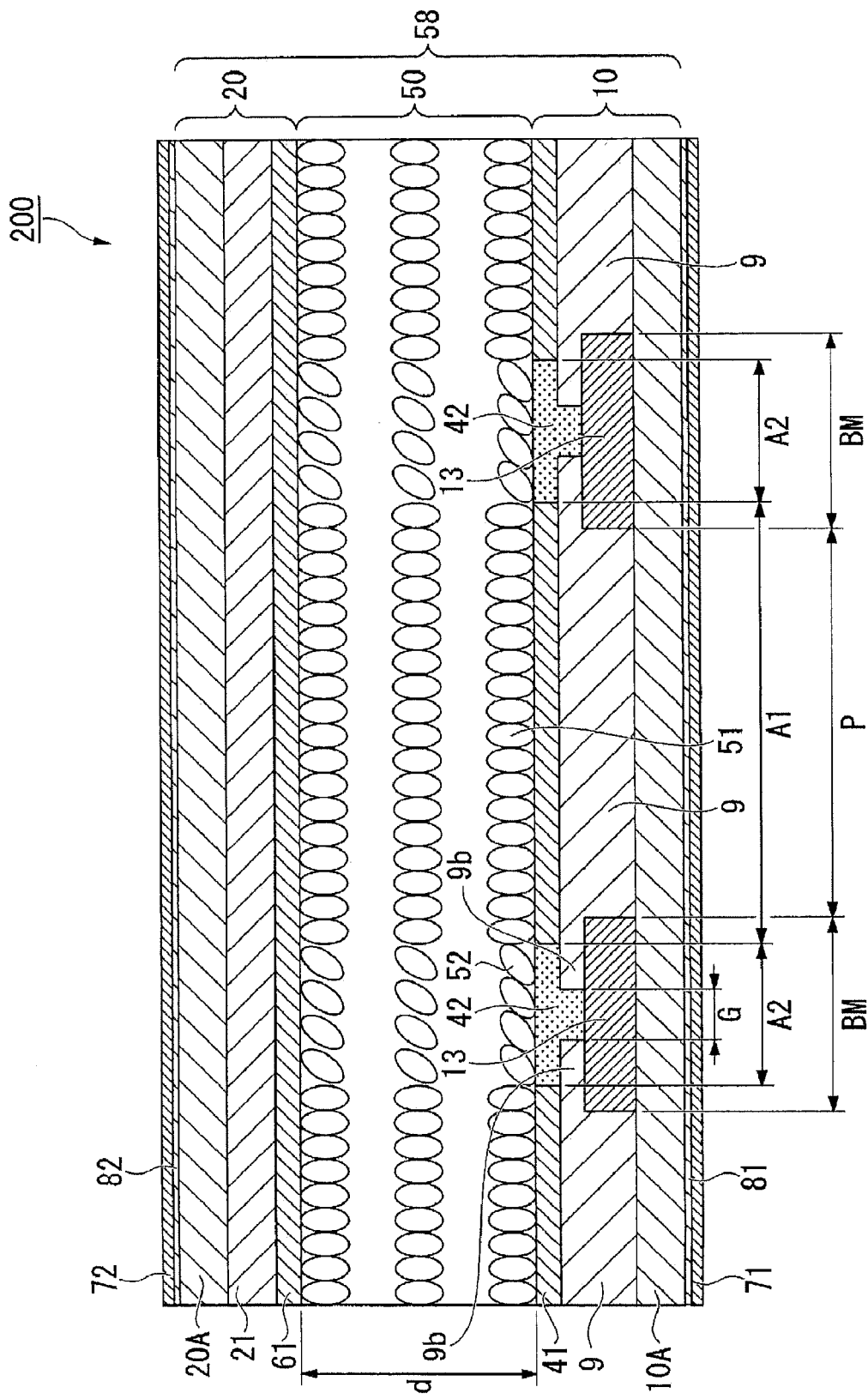
FIG. 19 is a sectional view schematically illustrating a transmission liquid crystal device in a second embodiment.

Here, FIG. 19 is a sectional view schematically illustrating a transmission liquid crystal device of the embodiment.

A transmission liquid crystal device 200 in the second embodiment of the invention differs from that in the first embodiment in that a pair of quarter-wave plates 81 and 82 are disposed on both sides of a liquid crystal panel 58 and a pair of polarizing plates 71 and 72 are disposed outside the pair of quarter-wave plates 81 and 82.

As illustrated in FIG. 19, the quarter-wave plates 81 and 82, which cause an optical path difference having an approximately quarter wavelength among light beams of linearly polarized light having transmission axes orthogonal to each other, are disposed outside a TFT array substrate 10 and a counter substrate 20, respectively, so as to sandwich the liquid crystal panel 58.

The polarizing plates 71 and 72 are disposed in a cross-Nicol configuration outside both the quarter-wave plates 81 and 82.

Figure 20A:
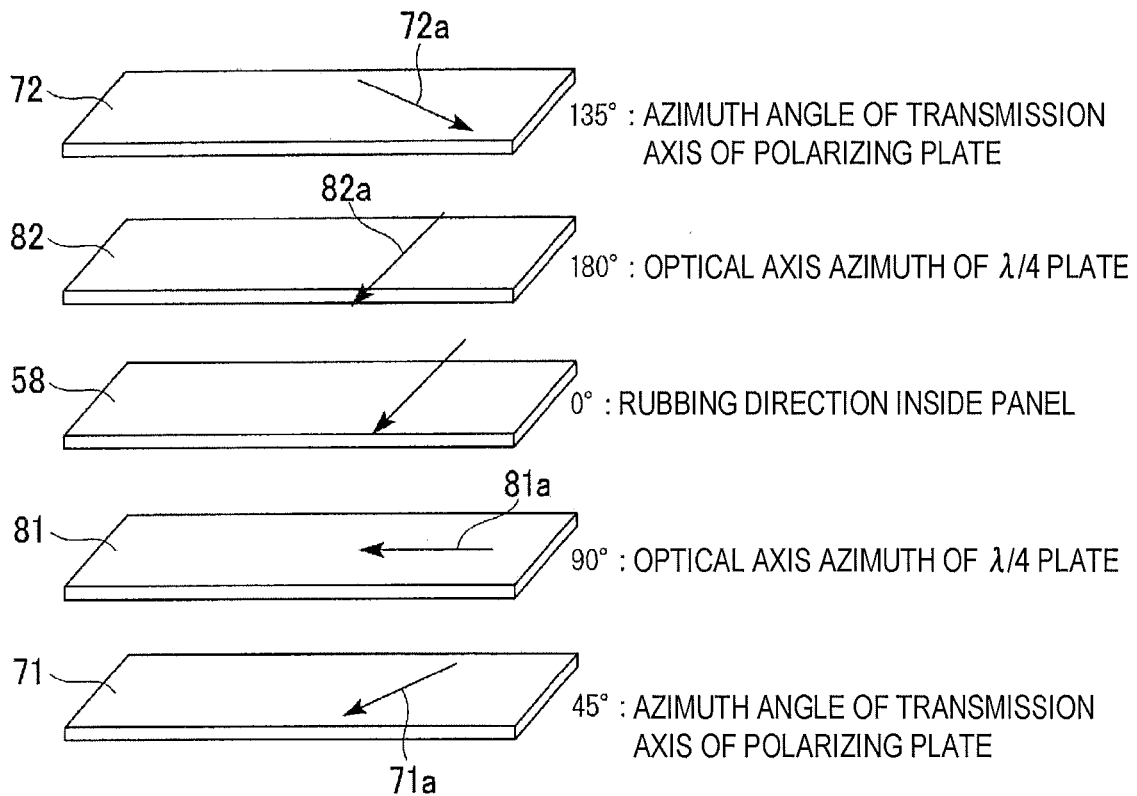
FIGS. 20A and 20B illustrate arrangement of optical axes of quarter-wave plates and polarizing plates.
Figure 20B:
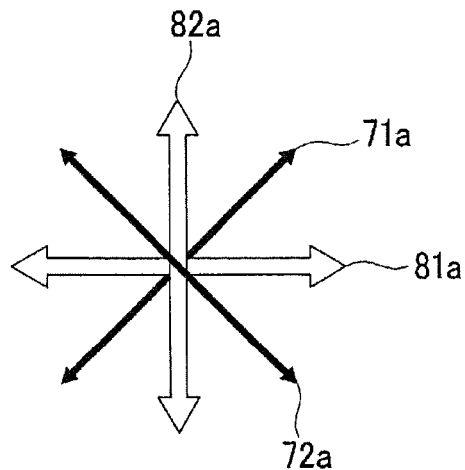

FIGS. 20A and 20B illustrate arrangement of optical axes of the quarter-wave plates 81 and 82 and the polarizing plates 71 and 72.

As illustrated in FIG. 20B, a polarizing axis 71a of the polarizing plate 71 is approximately orthogonal to a polarizing axis 72a of the polarizing plate 72 when seen perpendicularly to the substrate surface.

An optical axis (slow axis) 81a of the quarter-wave plate 81 is approximately orthogonal to an optical axis 82a of the quarter-wave plate 82.

Both an angle between the polarizing axis 71a and the optical axis 81a and an angel between the polarizing axis 72a and the optical axis 82a are approximately 45 degrees.

That is, the polarizing plate 71 and the quarter-wave plate 81 constitute a circularly polarizing plate, and the polarizing plate 72 and the quarter-wave plate 82 also constitute circularly polarizing plate.

Transmission Simulation of First Embodiment

The result of a transmission simulation for a transmission liquid crystal device in the first embodiment will be described below.

Figure 21:
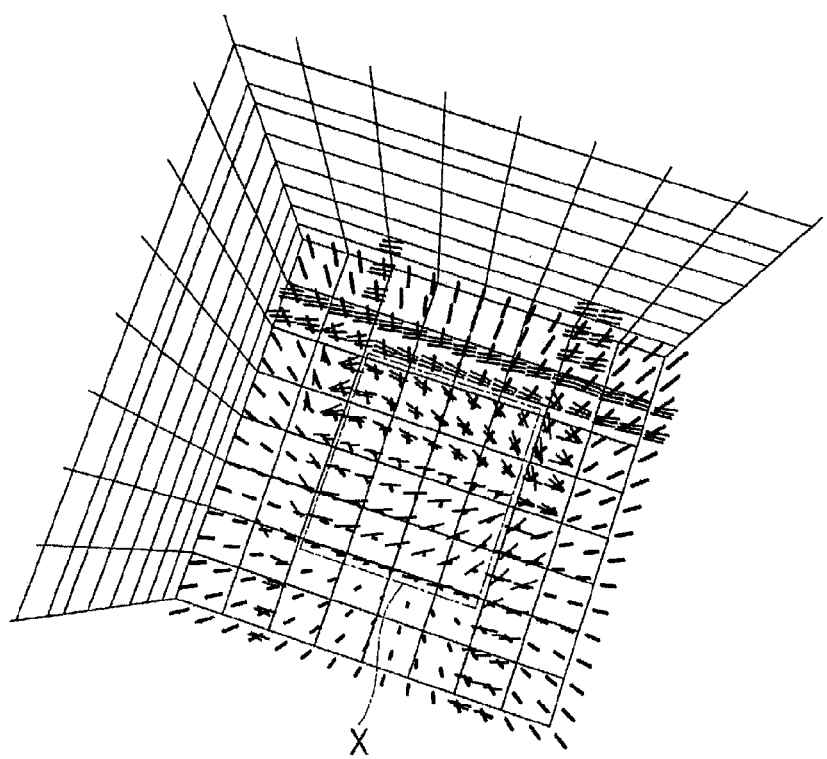
FIG. 21 is a perspective view (simulation) illustrating a director distribution of liquid crystal molecules on a pixel electrode when voltage is applied only to one pixel.

Here, FIG. 21 is a perspective view illustrating a director distribution of liquid crystal molecules on a pixel electrode.

Figure 22:
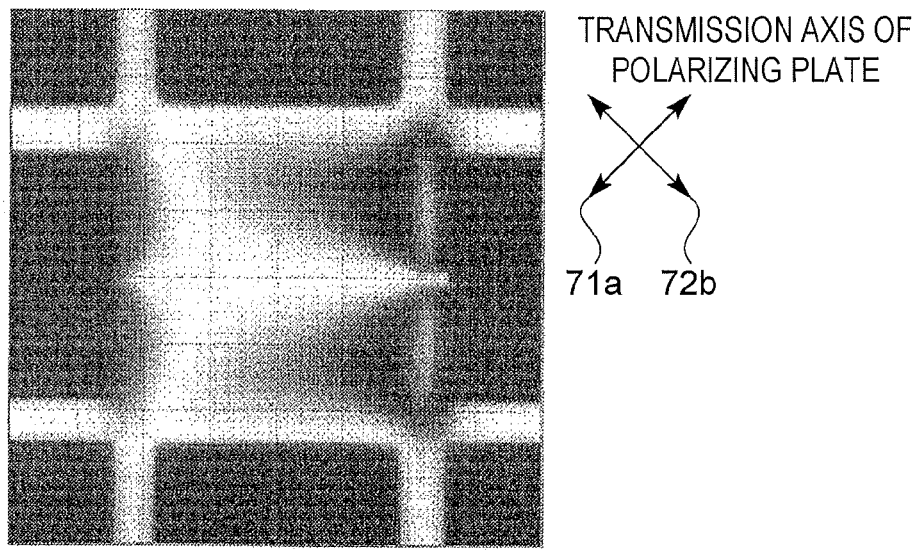
FIG. 22 illustrates a state of light transmission in one pixel with voltage applied in the case where quarter-wave plates are not inserted on both sides of a liquid crystal display element.

FIG. 22 illustrates a state of light transmission in one pixel with voltage applied.

As illustrated in FIG. 4, light, which is emitted from a light source and is transmitted through the polarizing plate 71 and the liquid crystal panel 58 in this order, is emitted from the polarizing plate 72 in the same state of polarization as that of linearly polarized light with a phase difference of $\lambda/2$ imparted by the liquid crystal panel 58.

The orientation of liquid crystal molecules when voltage applied is different from a predetermined orientation direction because of the correlation of azimuthal anchoring defined by the electric field in an end of the pixel electrode 9 (pixel portion X) and the horizontal alignment film 42, and there exists, in part, an area where molecules rotate in an azimuth angle direction (refer to FIG. 21).

If such the orientation (azimuth angle direction) of liquid crystal molecules is in agreement with the transmission axis of either the polarizing plate 71 or 72, the transmittance in this portion decreases as illustrated in FIG. 22.

In the above transmission liquid crystal device 1 of the first embodiment, with no voltage applied, it was possible to prevent that liquid crystal molecules horizontally aligned in a hybrid aligned nematic (HAN) alignment area had influence on the orientation of liquid crystal molecules in the adjacent vertical alignment area.

However, it was found that such a problem occurred with voltage applied.

The second embodiment described below is to solve such a problem and has an object to prevent decrease in light transmittance caused by the azimuth of liquid crystal molecules.

Transmission Simulation of Second Embodiment

The result of a transmission simulation for a transmission liquid crystal device in the second embodiment will be described below.

Figure 23:
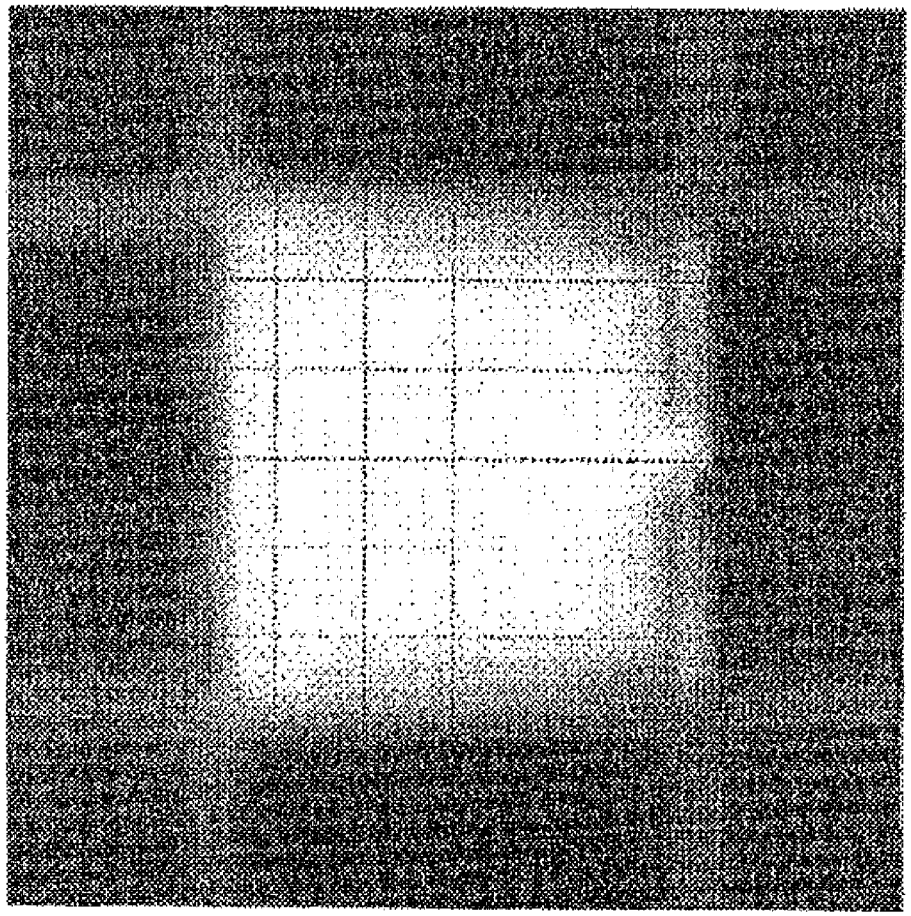
FIG. 23 illustrates a state of light transmission in one pixel with voltage applied in the case where the quarter-wave plates are inserted on both sides of the liquid crystal display element.

Here, FIG. 23 illustrates a state of light transmission in one pixel with voltage applied.

Note that description will be given below appropriately referring to FIGS. 19 and 20A.

As illustrated in FIGS. 19 and 20A, linearly polarized light that is emitted from a light source and is transmitted through the polarizing plate 71 is provided with a phase difference of $\lambda/4$ by the quarter-wave plate 81 to be converted into circularly polarized light.

The circularly polarized light is provided with a phase difference of substantially $\lambda/2$ to become a counter-rotating circularly polarized light in the liquid crystal panel 58, and further becomes linearly polarized light, which is orthogonal to linearly polarized light that has been incident, by the quarter-wave plate 82.

This light is then transmitted through the polarizing plate 72.

In this way, the quarter-wave plates 81 and 82 and the polarizing plates 71 and 72 are provided on both sides of the liquid crystal panel 58.

As a result, a birefringence effect is obtained without depending on the azimuth of liquid crystal molecules.

This allows the luminance of the transmission liquid crystal device 200 to be greatly improved.

With no voltage applied, liquid crystals are in a state of vertical alignment.

The linearly polarized light that is transmitted through the polarizing plate 71 is provided with a phase difference of $\lambda/4$ by the quarter-wave plate 81 to be converted into circularly polarized light, as described above.

In the liquid crystal layer, this light is not provided with a phase difference and therefore not changed.

The light is converted into the original linearly polarized light by the quarter-wave plate 82.

In the polarizing plate 72, the light is orthogonal to the transmission axis and therefore cannot be transmitted to be displayed as black.

As described above, a liquid crystal device as one embodiment of the invention has been described.

However, the invention is not limited to this.

The invention is not limited to the wording described in the appended claims and ranges over replacements that a person skilled in the art can easily make from the wording, and improvements based on knowledge that a person skilled in the art generally uses can be appropriately added, unless such replacements and improvements depart from the scope described in the appended claims.

For example, while only an active matrix liquid crystal device using a TFT element is described in the embodiment, the invention is not limited to this but can be applied to an active matrix liquid crystal device using a thin film diode (TFD) element, a passive matrix liquid crystal device, and the like.

While only a transmission liquid crystal device is described in the embodiment, the invention is not limited to this but can be applied to reflection type and transflective type liquid crystal devices.

Thus, the invention can be applied to a liquid crystal device having any structure.

Electronic Apparatus

An example of an electronic apparatus including a liquid crystal device of the above embodiments will be described.

Figure 24A:
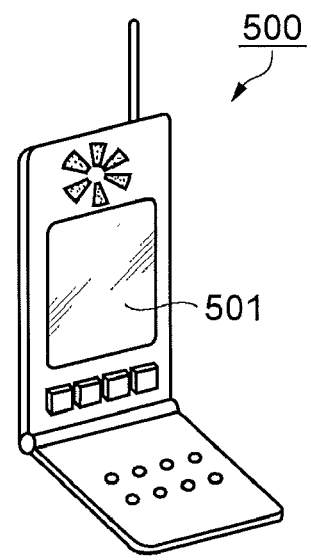
FIGS. 24A to 24C are perspective views illustrating some examples of an electronic apparatus according to one embodiment of the invention.

FIG. 24A is a perspective view illustrating one example of a cellular phone.

In FIG. 8A, reference numeral 500 denotes a cellular phone body, and reference numeral 501 denotes a liquid crystal display using a liquid crystal device of the embodiment.

Figure 24B:
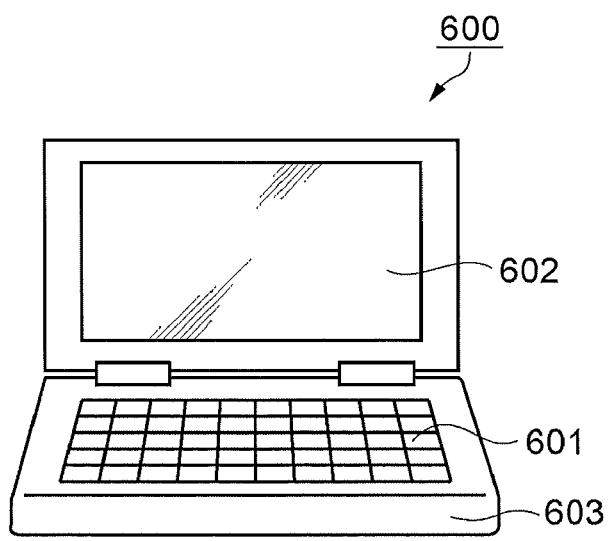

FIG. 24B is a perspective view illustrating one example of a portable information processor such as a word processor and a personal computer.

In FIG. 24B, reference numeral 600 denotes an information processor, 601 an input unit such as a key board, 603 an information processor body, and 602 a liquid crystal display using a liquid crystal device of the embodiment.

Figure 24C:
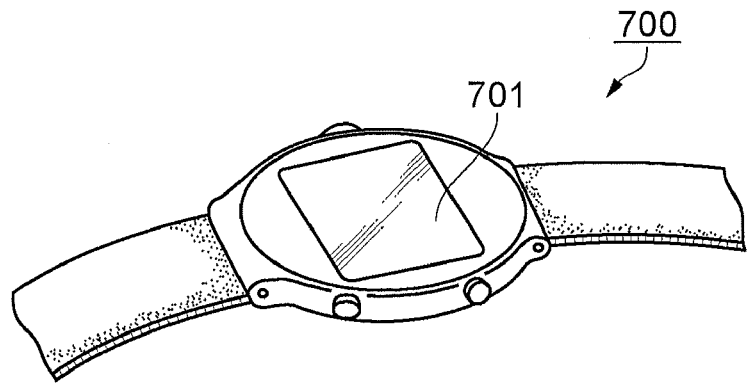

FIG. 24C is a perspective view illustrating one example of a wrist watch type electronic apparatus.

In FIG. 24C, reference numeral 700 denotes a watch body, and 701a liquid crystal display using a liquid crystal device of the above embodiment.

The electronic apparatuses illustrated in FIG. 24 as mentioned above are ones having displays to which a liquid crystal device that is one example of the invention described above is applied.

Therefore, these apparatuses have high contrast and high display quality.

Projection Display Apparatus

Next, the configuration of a projection display apparatus (projector) including a liquid crystal device of the embodiment as light modulation means is described with reference to FIG. 25.

Figure 25:
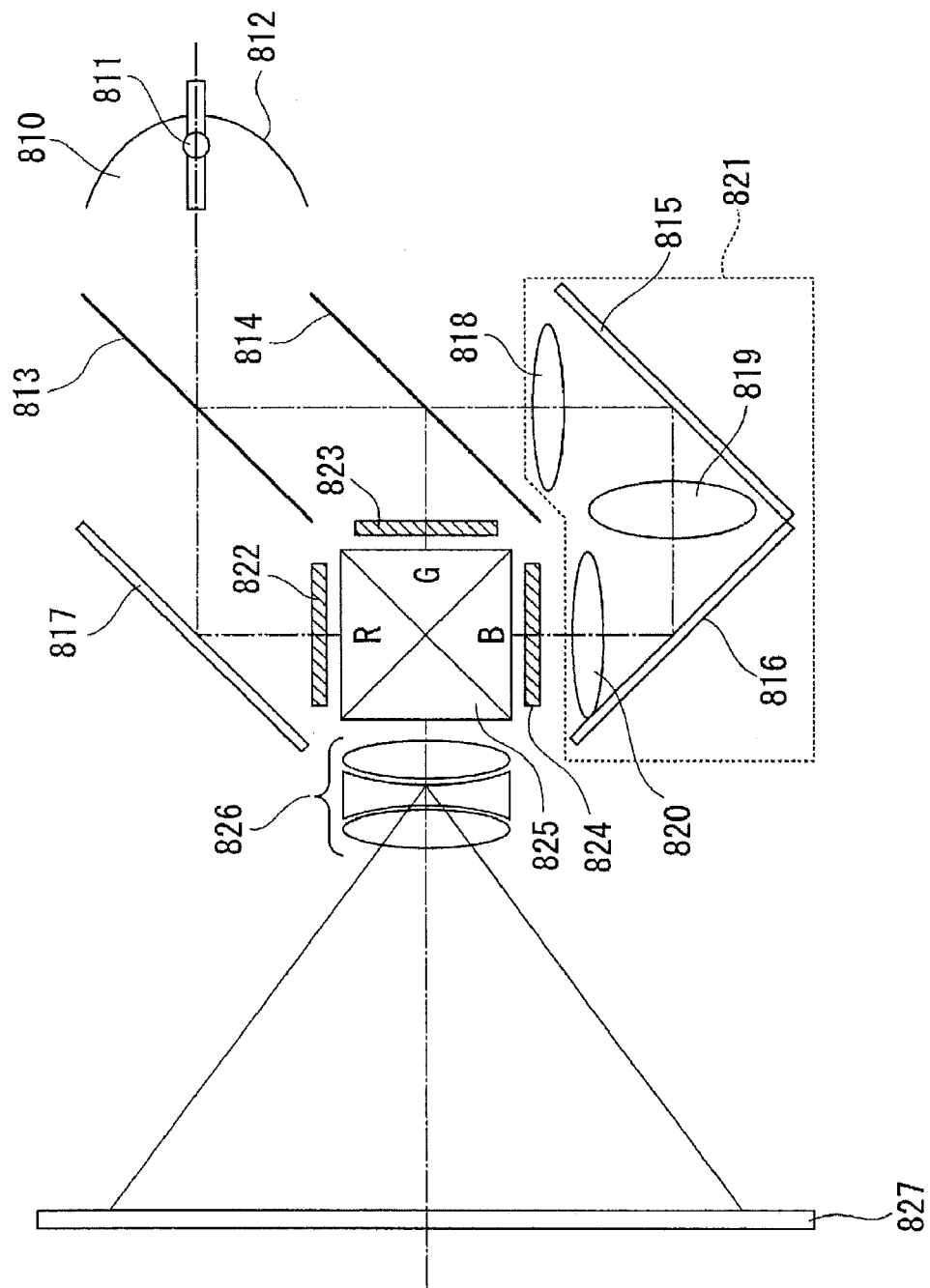
FIG. 25 illustrates one example of a projection display apparatus according to one embodiment of the invention.

FIG. 25 is a schematic structure view illustrating the main parts of a projection display apparatus using a liquid crystal device of the above embodiment as a light modulation device.

In FIG. 25, reference numeral 810 denotes a light source, 813 and 814 dichroic mirrors, 815, 816, and 817 reflection mirrors, 818 an incident lens, 819 a relay lens, 820 an emitting lens, 822, 823, and 824 liquid crystal light modulation devices, 825 a cross dichroic prism, and 826 a projection lens.

A light source 810 includes a lamp 811 such as a metal halide lamp and a reflector 812 that reflects light of a lamp.

A B/G (blue and green) light reflection dichroic mirror 813 transmits red light of luminous flux from the light source 810 and reflects blue light and green light.

The transmitted red light is reflected by a reflection mirror 817 and is incident on a red light liquid crystal light modulation device 822 including a liquid crystal device as one example of the invention described above.

On the other hand, among colored light reflected by the dichroic mirror 813, green light is reflected by a green light reflection dichroic mirror 814, and is incident on a green light liquid crystal light modulation device 823 including a liquid crystal device as one example of the invention described above.

Note that blue light passes through the second dichroic mirror 814.

For blue light, to compensate the optical path length being different from those of green light and red light, light guide means 821 constituted of a relay lens system including an incident lens 818, a relay lens 819, and an emitting lens 820 is provided.

Through this means, blue light is incident on a blue light liquid crystal light modulation device 824 including a liquid crystal device as one example of the invention described above.

Three colored lights modulated by the light modulation devices are incident on the cross dichroic prism 825.

In this prism, four rectangular prisms are laminated, and on the inner surface thereof, a dielectric multilayer that reflects red light and a dielectric multilayer that reflects blue light are formed in a cross shape.

By these dielectric multilayers, three colored lights are combined to form light representing a color image.

The combined light is projected on a screen 827 by a projection lens 826, which is a projecting optical system, so that an enlarged image is displayed.

A projection display apparatus having the above configuration includes a liquid crystal device as one example of the invention described above, and therefore there is no such a problem that rubbing stripes occurred when a rubbing treatment is applied.

Thus, the projection display apparatus having high contrast and high display quality is achieved.

What is claimed is:

1. A liquid crystal device, comprising:
   a first substrate;
   a second substrate disposed facing the first substrate;
   a liquid crystal layer sandwiched between the first substrate and the second substrate and composed of a liquid crystal exhibiting, in an initial alignment state thereof, a vertical alignment and having negative dielectric anisotropy;
   a light shielding film, formed on a side of the liquid crystal layer on the first substrate, corresponding to a non-display region and defining a display region;
   a pixel electrode disposed, on the first substrate, from the display region with a periphery projecting on the light shielding film;
   a vertical alignment film disposed, on the pixel electrode, only in the display region or from the display region with a periphery projecting in the non-display region; and
   a horizontal alignment film disposed, in an area without the vertical alignment film above the light shielding film, with a periphery projecting on the pixel electrode.

2. The liquid crystal device according to claim 1, wherein the liquid crystal on the horizontal alignment film has a pretilt angle (LP) satisfying a range of $LP \leq A \times LPW + B$, where LPW is a width of the periphery of the horizontal alignment film projecting on the pixel electrode, $A = (97 - 6.5 \times d) \times EG^{(-0.58)}$, $B = 22 \times \log e(EG) + (56.7 - 12 \times d)$, EG is a distance between the pixel electrode, and d is a cell gap, and further the A is in a range from 72.64 to 221.9 inclusive and the B is in a range from −8.7 to 42.7 inclusive.

3. The liquid crystal device according to claim 1, wherein the horizontal alignment film is made of photosensitive resin.

4. The liquid crystal device according to claim 1, further comprising:
   a pair of quarter-wave plates disposed outside the first substrate and the second substrate such that slow axes of the pair of quarter-wave plates are orthogonal to each other; and
   polarizing plates disposed outside the pair of quarter-wave plates such that transmission axes of the polarizing plates have approximately 45 degrees with respect to the slow axes of the pair of quarter-wave plates and the transmission axes of the polarizing plates are orthogonal to each other.

5. A method for manufacturing a liquid crystal device including:
   a first substrate;
   a second substrate disposed facing the first substrate;
   a liquid crystal layer sandwiched between the first substrate and the second substrate and composed of a liquid crystal exhibiting, in an initial alignment state thereof, a vertical alignment and having negative dielectric anisotropy; and
   a light shielding film, formed on a side of the liquid crystal layer on the first substrate, corresponding to a non-display region and defining a display region, the method comprising:
   (a) forming, on the first substrate, a pixel electrode from the display region with a periphery projecting on the light shielding film;
   (b) forming, on the pixel electrode, a vertical alignment film only in the display region or from the display region with a periphery projecting in the non-display region; and
   (c) forming, in an area without the vertical alignment film above the light shielding film, a horizontal alignment film with a periphery projecting on the pixel electrode.

6. The method for manufacturing a liquid crystal device according to claim 5, wherein the step (c) includes:
   applying photosensitive resin to form a resin film;
   performing light exposure and development using the light shielding film as a mask from a side opposite to the light shielding film on the first substrate to form an alignment film pattern corresponding to the light shielding film; and
   rubbing the alignment film pattern to make the horizontal alignment film.

7. An electronic apparatus comprising the liquid crystal device according to claim 1.

* * * * *